United States Patent
Zhang et al.

(10) Patent No.: US 8,855,229 B2
(45) Date of Patent: Oct. 7, 2014

(54) METHOD AND DEVICE FOR TRANSMITTING/RECEIVING INFORMATION IN CLOSED-LOOP MULTI-ANTENNA SYSTEM

(75) Inventors: Ranran Zhang, Beijing (CN); Deshan Miao, Beijing (CN); Qiubin Gao, Beijing (CN); Meifang Jing, Beijing (CN); Rakesh Tamrakar, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 115 days.

(21) Appl. No.: 13/577,669

(22) PCT Filed: Jan. 31, 2011

(86) PCT No.: PCT/CN2011/000190
§ 371 (c)(1),
(2), (4) Date: Aug. 8, 2012

(87) PCT Pub. No.: WO2011/095064
PCT Pub. Date: Aug. 11, 2011

(65) Prior Publication Data
US 2012/0307935 A1  Dec. 6, 2012

(30) Foreign Application Priority Data
Feb. 8, 2010 (CN) .......................... 2010 1 0109923

(51) Int. Cl.
*H04L 27/00* (2006.01)
*H04B 7/06* (2006.01)
*H04B 7/04* (2006.01)
*H04L 25/03* (2006.01)

(52) U.S. Cl.
CPC ............ *H04B 7/0639* (2013.01); *H04B 7/0469* (2013.01); *H04B 7/0478* (2013.01); *H04L 25/03343* (2013.01); *H04B 7/0417* (2013.01); *H04B 7/0465* (2013.01)
USPC ........................................ 375/295

(58) Field of Classification Search
USPC .......... 375/295, 262, 267, 296, 316; 714/329, 714/335
See application file for complete search history.

(56) References Cited

U.S. PATENT DOCUMENTS

| | | | |
|---|---|---|---|
| 8,230,290 B2 * | 7/2012 | Seok et al. | 714/748 |
| 2008/0095258 A1 * | 4/2008 | She et al. | 375/262 |
| 2009/0282310 A1 | 11/2009 | Seok et al. | |

FOREIGN PATENT DOCUMENTS

| | | |
|---|---|---|
| CN | 101414864 A | 4/2009 |
| CN | 101527617 A | 9/2009 |

(Continued)

OTHER PUBLICATIONS

"Codebook design for 8T x DI MIMO", by Gatt, 3GPP TSG RAN WG1 meeting #59b, Jan. 18, 2010.
"A Flexible Feedback Concept", by Ericsson and ST-Ericsson, 3GPP TSG-RAN WG1 #59bis , Jan. 18, 2010.

(Continued)

*Primary Examiner* — Khai Tran
(74) *Attorney, Agent, or Firm* — Kilpatrick Townsend & Stockton LLP

(57) ABSTRACT

The present invention discloses a method for transmitting information in a closed loop multiple antenna system. The method includes that: a transmission apparatus receives information transmitted from a reception apparatus, wherein the information includes codeword index information; the transmission apparatus selects a corresponding codeword from a double-layer-structure-based codebook according to the codeword index information; the transmission apparatus generates a precoding matrix according to the selected codeword; the transmission apparatus performs precoding for data to be transmitted according to the precoding matrix; the transmission apparatus transmits the precoded data to the reception apparatus. The present invention can enable a formed and used codebook to match channel distribution characteristic of a dual-polarized antenna as much as possible, and minimize performance loss brought by codebook quantization, thereby performance of a precoding system can be effectively improved.

16 Claims, 3 Drawing Sheets

(56) References Cited

FOREIGN PATENT DOCUMENTS

| CN | 101534268 A | 9/2009 |
|---|---|---|
| KR | 20090054357 A | 5/2009 |

OTHER PUBLICATIONS

"DL Code book design for 8T× precoding", by LG Electronics, 3GPP TSG RAN WG1 Meeting #59bis , Jan. 18, 2010.

* cited by examiner

METHOD AND DEVICE FOR TRANSMITTING/RECEIVING INFORMATION IN CLOSED-LOOP MULTI-ANTENNA SYSTEM

FIELD OF HE INVENTION

The present application is a US National Stage of International Application No. PCT/CN2011/000190, filed 31 Jan. 2011, designating the United States, and claiming priority to Chinese Patent Application No. 201010109923.2 filed 8 Feb. 2010.

The present invention relates to the field of communications and particularly to a method and device for transmitting/receiving information in a closed-loop multi-antenna system.

BACKGROUND OF THE INVENTION

At present, a multi-antenna technology at physical layer has become one of crucial technologies in a next-generation wireless communication system. The multi-antenna technology has numerous advantages, for example, the throughput of the system can be improved with a multiplexing gain of multiple antennas, the performance of the system can be improved with a diversity gain of the multiple antennas, receiving terminals can be distinguished from each other with a directivity gain of the antennas to remove interference between the receiving terminals, etc.

A Multiple-Input Multiple-Output (MIMO) system uses multiple transmitting and receiving antennas and utilizes joint processing of a signal in the space, time and frequency domains to obtain rate, diversity and array gains. In the MIMO system, if a transmitter can acquire channel state information somehow, a transmission signal can be optimized dependent upon a channel characteristic to improve a reception quality and lower required complexity of a receiver. In a real system, typically a feedback of quantized channel state information is adopted to lower feedback overhead and feedback delay. The channel state information can be quantized in terms of a channel matrix and a statistic thereof or of a pre-processing parameter recommended by the receiver for use. The quantized channel state information is mapped into a set of a limited number of elements, which is referred to as a codebook.

In a codebook-based closed-loop MIMO system, a codebook is a key factor influencing the performance of the system. In each of the transmission modes 4, 5 and 6 of the Rel-8 long Term Evolution (LTE), a Precoding Matrix Indicator (PMI) feedback mechanism is adopted, that is, a User Equipment (UE) measures a channel according to a common pilot and reports index information of a codeword that it recommends for use to an eNodeB (eNB). With four common pilot ports, for example, a Householder transformation-based codebook is adopted, and there are sixteen selectable precoding matrices for each Rank of the closed-loop spatially multiplexing mode, i.e., the transmission mode 4. General characteristics of an Rel-8 LTE 4-antenna codebook include: 1) a Rank1 codebook is obtained by searching while considering a tradeoff between uncorrelated and correlated channels; 2) a nesting relationship holds between codebooks at the other Ranks and the Rank1 codebook; 3) a 8PSK (Phase Shift Keying) element is adopted for each codebook element to lower calculation complexity; 4) there are constant modulus and unitary characteristics; and 5) complexity of selecting a codeword can be lowered with a characteristic of the Householder transformation.

In an MIMO-based wireless communication system, e.g., an Rd-10 LTE-A system, the use of the PMI feedback mechanism can be continued, but the number of configuration combinations of Ranks and the numbers of transmitting antenna ports is far larger than that in the Rel-8 LTE due to an increased number (possibly eight, for example) of transmitting antennas. On one hand, no codebook has been defined for a large number of configuration combinations of Ranks and the number of transmitting antenna ports. On the other hand, the necessity to design a codebook for a spatially correlated channel has become more prominent as compared with the Rel-8 LTE system because the number of antennas constantly increases and the size of a base station is limited so that it is inevitably necessary to shorten the spacing between antennas and/or adopt polarized antennas. In view of the foregoing considerations, a linear codebook for a spatially correlated channel and a designing method thereof are indispensable technology issues in future wireless communication system researches and standardization. Furthermore, researchers consider as much as possible reserving the characteristics of the Rel-8 LTE codebook while designing a codebook in view of the good performance and excellent characteristics of the Rel-8 LTE 4-antenna codebook.

The existing Householder transformation method can not be applied directly to designing of an 8-antenna codebook. Generally the following several codebooks can inherit the characteristics (or a part thereof) of the Rel-8 LTE codebook at present.

A codebook 1: The Rel-8 codebook is transformed into an 8-antenna array codebook at the Rank1 The codebook 1 has a drawback of failing to satisfy a nesting relationship although the codebook 1 inherits a part of the characteristics of the Rel-8 LTE 4-antenna codebook, i.e., the constant modulus and the use of an 8PSK element. Since the codebook 1 is based upon extending the Rel-8 LTE 4-antenna codebook which results from optimization in view of both spatially correlated and spatially uncorrelated channels and a part of codewords of which is not suitable for the spatially correlated channel, there is a performance loss of the codebook 1 for an array of antennas at a small spacing.

A codebook 2: A number $4^7$ of 8×8 complex matrices with their elements being 8PSK elements are constructed in complex Hadamard transformation, and then a Rank1 codebook is obtained by searching in the optimizing method with a tradeoff between uncorrelated and correlated channels. The codebook 2 has a drawback of adopting only 8PSK elements although the codebook 2 inherits most of the characteristics of the Rel-8 LTE codebook, i.e., the constant modulus, unitary and nesting characteristics. Since a space consists of a number $4^7$ of 8×8 complex matrices with their elements being 8PSK elements is searched for the codebook 2 in a search criterion considering a performance tradeoff between spatially correlated and spatially uncorrelated channels, the performance of the codebook 2 over the spatially correlated channel is degraded.

A codebook 3: The Rank codebook is derived by multiplying sixteen different diagonal matrices by a 8-DFT (Discrete Fourier Transform) matrix, and the Rank1 codebook is composed of first columns of the sixteen 8×8 complex matrices. The codebook 3 has such a drawback that although the codebook 3 inherits a part of the characteristics of the Rel-8 LTE codebook, i.e., the constant modulus, unitary and nesting characteristics, complexity of pre-coding calculation will be increased because 16PSK elements are adopted. If there is no significant performance gain over other codebooks, the increased complexity of pre-coding calculation will become an extra burden.

A codebook 4: the codebook consists of respective rows (or columns) of one 8-DFT matrix and one 8×8 unitary matrix. The codebook 4 has a drawback of adopting only 8PSK elements although the codebook 4 inherits a part of the characteristics of the Rel-8 LTE codebook, i.e., the constant modulus, unitary and nesting characteristics. Also since the DFT matrix complies with the construction of an array response, both the codebook 3 and the codebook 4 are suitable for a pre-coding MIMO system over a spatially correlated channel. However, the angles of corresponding array responses of respective codewords in the codebook 3 and the codebook 4 are unchanged regardless of a specific distribution characteristic of the channel, so a performance loss of the pre-coding MIMO system may be incurred in a specific scenario.

Therefore, it is desired to propose an efficient design of a codebook and a solution to information transmission and reception using the codebook.

SUMMARY OF THE INVENTION

An object of embodiments of the invention is intended to address at least one of the foregoing drawbacks in the prior art particularly by designing and using a codebook in a two-stage structure and an information transmitting/receiving method using the codebook to improve the performance of a closed-loop multi-antenna system.

In order to attain the foregoing object, an aspect of the invention proposes a method for transmitting information in a closed-loop multi-antenna system, which includes the steps of: receiving, by a transmitting device, information including codeword index information transmitted from a receiving device; selecting, by the transmitting device, a corresponding codeword from a codebook in a two-stage structure according to the codeword index information; generating, by the transmitting device, a pre-coding matrix according to the selected codeword; pre-coding, by the transmitting device, data to be transmitted according to the pre-coding matrix; and transmitting, by the transmitting device, the pre-coded data to the receiving device.

A further aspect of the invention proposes a method for receiving information in a closed-loop multi-antenna system, which includes the steps of: receiving, by a receiving device, information transmitted from a transmitting device and estimating channel state information according to the information; selecting, by the receiving device, a corresponding codeword from codebook in a two-stage structure according to the channel state information and generating codeword index information of the selected codeword; and transmitting, by the receiving device, the codeword index information of the codeword to the transmitting device.

A further aspect of the invention proposes a transmitting device including a receiving module, a codeword determining module, a pre-coding matrix calculating module, a pre-coding module and a transmitting module, wherein: the receiving module is configured to receive information including codeword index information transmitted from a receiving device; the codeword determining module is configured to select a corresponding codeword from a codebook in a two-stage structure according to the codeword index information; the pre-coding matrix calculating module is configured to generate a pre-coding matrix according to the selected codeword; the pre-coding module is configured to pre-code data to be transmitted according to the pre-coding matrix; and the transmitting module is configured to transmit the pre-coded data to the receiving device.

A further aspect of the invention proposes a receiving device including a receiving module, a channel estimating module, a codeword selecting module, a codeword index information generating module and a transmitting module, wherein: the receiving module is configured to receive information transmitted from a transmitting device; the channel estimating module is configured to estimate channel state information according to the information; the codeword selecting module is configured to select a corresponding codeword from a codebook in a two-stage structure according to the channel state information; the codeword index information generating module is configured to generate codeword index information of the selected codeword; and the transmitting module is configured to transmit the codeword index information of the codeword to the transmitting device.

In the foregoing solutions proposed according to the embodiments of the invention, a formed and used codebook matches as closely as possibly a channel distribution characteristic of a dually polarized antenna to minimize a performance loss due to quantization of the codebook, thereby improving effectively the performance of a pre-coding system. Furthermore, the codebook proposed by the invention has a two-stage structure and can support both a feedback of one PMI and a feedback of two PMIs.

Additional aspects and advantages of the invention will be partly presented in the following description, partly become apparent from the following description or be learned from practicing of the invention.

BRIEF DESCRIPTION OF THE DRAWINGS

The foregoing and/or additional aspects and advantages of the invention will become apparent and readily understood from the following description of embodiments in connection with the drawings in which.

DETAILED DESCRIPTION OF THE EMBODIMENTS

Figure 1:
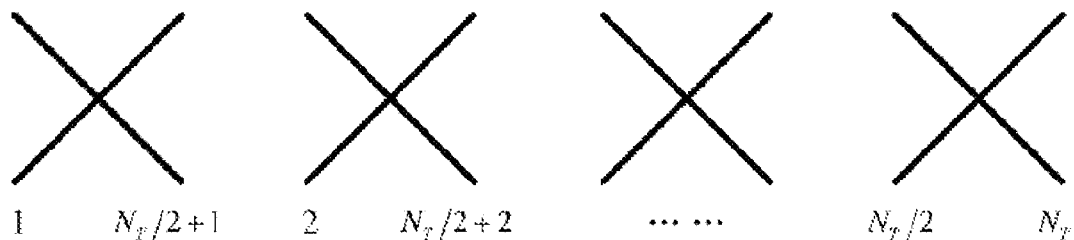
FIG. 1 is a schematic diagram of the convention of an antenna indexing method of a dually polarized antenna according to an embodiment of the invention.

Embodiments of the invention will be described in details below; and examples of the embodiments to be described will be illustrated in the drawings throughout identical or similar reference numerals denote identical or similar elements or elements with identical or similar functions. The embodiments to be described below with reference to the drawings are illustrative and merely intended to explain the invention but will not be construed as limiting the invention.

Firstly a codeword of the invention will be introduced below, and then a method and device for transmitting/receiving information in a multi-antenna system according to embodiments of the invention will be introduced in details in the form of particular embodiments.

Assumed an MIMO system includes $N_T$ transmitting antennas and $N_R$ receiving antennas, and the number of ranks is r, where is an even number and $N_R \geq 1$ and $r \geq 1$. For the convenience of a description, firstly the convention of an antenna indexing method of a dually polarized antenna will be described. As illustrated in FIG. 1, an antenna indexing method is to index firstly antennas sequentially in one polarization direction and then antennas sequentially in the other polarization direction. It shall be noted that a codebook of a dually polarized antenna system and a designing method thereof are independent of an antenna indexing method of dually polarized antennas, and if the convention of the antenna indexing method is changed, corresponding adjusting of indexes of the antennas in the codebook will suffice.

In an embodiment of the invention, a codeword $c_n^r$ in a Rank-r codebook in a two-stage structure satisfies the following relationship:

$$c_n^r = \begin{matrix}[\Phi_k^r(:,1) \otimes w_m^r(:,1) & \Phi_k^r(:,2) \otimes w_m^r(:,2) & \ldots \\ & \Phi_k^r(:,r) \otimes w_m^r(:,r)]\end{matrix}$$
$$= \begin{bmatrix} \Phi_k^r(1,1)w_m^r(:,1) & \Phi_k^r(1,2)w_m^r(:,2) & \ldots & \Phi_k^r(1,r)w_m^r(:,r) \\ \Phi_k^r(2,1)w_m^r(:,1) & \Phi_k^r(2,2)w_m^r(:,2) & \ldots & \Phi_k^r(2,r)w_m^r(:,r) \end{bmatrix}$$

where $\Phi_k^r$ is a 2×r-dimension matrix, k=0, 1, ..., $K_r$–1, $w_m^r$ is a $N_T/2$×r-dimension matrix, m=0, 1, ..., $M_r$–1, X(:,l) represents the $l^{th}$ column of a matrix X, X($l_1,l_2$) represents an element in the $l_1^{th}$ row and in the $l_2^{th}$ column of the matrix X, and $\otimes$ represents a direct product of matrices; and a set consists of a number $K_r$ of $\Phi_k^r$ is a transformation codebook of the codebook in the two-stage structure, and a set consists of a number $M_r$ of $w_m^r$ codebook of the codebook in the two-stage structure.

Since the codebook proposed according to the invention has a two-stage structure, both a feedback of one PMI and a feedback of two PMIs can be supported.

Specific codebooks will be described below as examples.

Codebook 1:

In an embodiment of the invention, $M_3 = M_4 = 8$.

Basic Codebook:

| Index | Rank3 basic codebook $w_m^3$ | Rank4 basic codebook $w_m^4$ |
|---|---|---|
| 0 | [$v_0$ $v_6$ $v_6$] | [$v_0$ $v_0$ $v_6$ $v_6$] |
| 1 | [$v_1$ $v_7$ $v_7$] | [$v_1$ $v_1$ $v_7$ $v_7$] |
| 2 | [$v_2$ $v_0$ $v_0$] | [$v_2$ $v_2$ $v_0$ $v_0$] |
| 3 | [$v_3$ $v_1$ $v_1$] | [$v_3$ $v_3$ $v_1$ $v_1$] |
| 4 | [$v_4$ $v_2$ $v_2$] | [$v_4$ $v_4$ $v_2$ $v_2$] |
| 5 | [$v_5$ $v_3$ $v_3$] | [$v_5$ $v_5$ $v_3$ $v_3$] |
| 6 | [$v_6$ $v_4$ $v_4$] | [$v_6$ $v_6$ $v_4$ $v_4$] |
| 7 | [$v_7$ $v_5$ $v_5$] | [$v_7$ $v_7$ $v_5$ $v_5$] |

Transformation Codebook:

| Index k | Rank3 transformation codebook $\Phi_k^3$ | Rank4 transformation codebook $\Phi_k^4$ |
|---|---|---|
| 0 | $\begin{bmatrix} 1 & 1 & 1 \\ 1 & 1 & -1 \end{bmatrix}$ | $\begin{bmatrix} 1 & 1 & 1 & 1 \\ 1 & -1 & 1 & -1 \end{bmatrix}$ |
| 1 | $\begin{bmatrix} 1 & \sqrt{2} & 0 \\ 1 & 0 & \sqrt{2} \end{bmatrix}$ | $\begin{bmatrix} 1 & 0 & 1 & 0 \\ 0 & 1 & 0 & 1 \end{bmatrix}$ |

Codebook 1:

| Index | Rank3 codebook | Rank4 codebook |
|---|---|---|
| 0 | $\begin{bmatrix} v_0 & \sqrt{2}v_6 & 0 \\ v_0 & 0 & \sqrt{2}v_6 \end{bmatrix}$ | $\begin{bmatrix} v_0 & 0 & v_6 & 0 \\ 0 & v_0 & 0 & v_6 \end{bmatrix}$ |
| 1 | $\begin{bmatrix} v_1 & \sqrt{2}v_7 & 0 \\ v_1 & 0 & \sqrt{2}v_7 \end{bmatrix}$ | $\begin{bmatrix} v_1 & 0 & v_7 & 0 \\ 0 & v_1 & 0 & v_7 \end{bmatrix}$ |
| 2 | $\begin{bmatrix} v_2 & \sqrt{2}v_0 & 0 \\ v_2 & 0 & \sqrt{2}v_0 \end{bmatrix}$ | $\begin{bmatrix} v_2 & 0 & v_0 & 0 \\ 0 & v_2 & 0 & v_0 \end{bmatrix}$ |
| 3 | $\begin{bmatrix} v_3 & \sqrt{2}v_1 & 0 \\ v_3 & 0 & \sqrt{2}v_1 \end{bmatrix}$ | $\begin{bmatrix} v_3 & 0 & v_1 & 0 \\ 0 & v_3 & 0 & v_1 \end{bmatrix}$ |
| 4 | $\begin{bmatrix} v_4 & \sqrt{2}v_2 & 0 \\ v_4 & 0 & \sqrt{2}v_2 \end{bmatrix}$ | $\begin{bmatrix} v_4 & 0 & v_2 & 0 \\ 0 & v_4 & 0 & v_2 \end{bmatrix}$ |
| 5 | $\begin{bmatrix} v_5 & \sqrt{2}v_3 & 0 \\ v_5 & 0 & \sqrt{2}v_3 \end{bmatrix}$ | $\begin{bmatrix} v_5 & 0 & v_3 & 0 \\ 0 & v_5 & 0 & v_3 \end{bmatrix}$ |
| 6 | $\begin{bmatrix} v_6 & \sqrt{2}v_4 & 0 \\ v_6 & 0 & \sqrt{2}v_4 \end{bmatrix}$ | $\begin{bmatrix} v_6 & 0 & v_4 & 0 \\ 0 & v_6 & 0 & v_4 \end{bmatrix}$ |
| 7 | $\begin{bmatrix} v_7 & \sqrt{2}v_5 & 0 \\ v_7 & 0 & \sqrt{2}v_5 \end{bmatrix}$ | $\begin{bmatrix} v_7 & 0 & v_5 & 0 \\ 0 & v_7 & 0 & v_5 \end{bmatrix}$ |
| 8 | $\begin{bmatrix} v_0 & v_6 & v_6 \\ v_0 & v_6 & -v_6 \end{bmatrix}$ | $\begin{bmatrix} v_0 & v_0 & v_6 & v_6 \\ v_0 & -v_0 & v_6 & -v_6 \end{bmatrix}$ |
| 9 | $\begin{bmatrix} v_1 & v_7 & v_7 \\ v_1 & v_7 & -v_7 \end{bmatrix}$ | $\begin{bmatrix} v_1 & v_1 & v_7 & v_7 \\ v_1 & -v_1 & v_7 & -v_7 \end{bmatrix}$ |
| 10 | $\begin{bmatrix} v_2 & v_0 & v_0 \\ v_2 & v_0 & -v_0 \end{bmatrix}$ | $\begin{bmatrix} v_2 & v_2 & v_0 & v_0 \\ v_2 & -v_2 & v_0 & -v_0 \end{bmatrix}$ |
| 11 | $\begin{bmatrix} v_3 & v_1 & v_1 \\ v_3 & v_1 & -v_1 \end{bmatrix}$ | $\begin{bmatrix} v_3 & v_3 & v_1 & v_1 \\ v_3 & -v_3 & v_1 & -v_1 \end{bmatrix}$ |
| 12 | $\begin{bmatrix} v_4 & v_2 & v_2 \\ v_4 & v_2 & -v_2 \end{bmatrix}$ | $\begin{bmatrix} v_4 & v_4 & v_2 & v_2 \\ v_4 & -v_4 & v_2 & -v_2 \end{bmatrix}$ |
| 13 | $\begin{bmatrix} v_5 & v_3 & v_3 \\ v_5 & v_3 & -v_3 \end{bmatrix}$ | $\begin{bmatrix} v_5 & v_5 & v_3 & v_3 \\ v_5 & -v_5 & v_3 & -v_3 \end{bmatrix}$ |
| 14 | $\begin{bmatrix} v_6 & v_4 & v_4 \\ v_6 & v_4 & -v_4 \end{bmatrix}$ | $\begin{bmatrix} v_6 & v_6 & v_4 & v_4 \\ v_6 & -v_6 & v_4 & -v_4 \end{bmatrix}$ |
| 15 | $\begin{bmatrix} v_7 & v_5 & v_5 \\ v_7 & v_5 & -v_5 \end{bmatrix}$ | $\begin{bmatrix} v_7 & v_7 & v_5 & v_5 \\ v_7 & -v_7 & v_5 & -v_5 \end{bmatrix}$ |

Where:

| Index | $v_n$ |
|---|---|
| 0 | $v_0 = [1\;1\;1\;1]^T$ |
| 1 | $v_1 = [1\;(1-j)/\sqrt{2}\;-j\;(-1-j)/\sqrt{2}]^T$ |
| 2 | $v_2 = [1\;-j\;-1\;j]^T$ |
| 3 | $v_3 = [1\;(-1-j)/\sqrt{2}\;j\;(1-j)/\sqrt{2}]^T$ |

-continued

| Index | $v_n$ |
|---|---|
| 4 | $v_4 = [1\ -1\ 1\ -1]^T$ |
| 5 | $v_5 = [1\ (-1+j)/\sqrt{2}\ -j\ (1+j)/\sqrt{2}]^T$ |
| 6 | $v_6 = [1\ j\ -1\ -j]^T$ |
| 7 | $v_7 = [1\ (1+j)/\sqrt{2}\ j\ (-1+j)/\sqrt{2}]^T$ |

It shall be noted that $v_n$ is a truncated 8-DFT vector or any other truncated $2^K$-DFT vector, where $2^K$ is larger than or equal to $N_T/2$ and K is a natural number. If a codeword with the unitary characteristic is constructed, mutually orthogonal column vectors of the codeword $w_m$ of the basic codebook, corresponding to mutually non-orthogonal columns of the codeword $\Phi_k$ in the transformation codebook, will suffice. For example, first two columns of the codeword $$\Phi_k^3 = \begin{bmatrix} 1 & 1 & 1 \\ 1 & 1 & -1 \end{bmatrix}$$

with k=0 in the transformation codebook of the codebook 1 are non-orthogonal, and then first two columns of the codeword $w_m^3$ of the basic codebook shall be kept orthogonal; and $1^{st}$ and $3^{rd}$ columns of and $2^{nd}$ and $4^{th}$ columns of the codeword $$\Phi_k^4 = \begin{bmatrix} 1 & 1 & 1 & 1 \\ 1 & -1 & 1 & -1 \end{bmatrix}$$

with k=0 in the transformation codebook are non-orthogonal, and then $1^{st}$ and $3^{rd}$ columns of and also $2^{nd}$ and $4^{th}$ columns of the codeword $w_m^4$ of the basic codebook shall be kept orthogonal.

$v_n$ can be applied to codebooks of the following respective embodiments.

Codebook 2:

Matrices $\Phi_k$ and $w_m$ are defined as follows:

| Index | $\Phi_k$ |
|---|---|
| 0 | $\Phi_0 = \begin{bmatrix} 1 & 1 & 1 & 1 \\ 1 & -1 & 1 & -1 \end{bmatrix}$ |
| 1 | $\Phi_1 = \begin{bmatrix} 1 & 1 & 1 & 1 \\ -1 & 1 & -1 & 1 \end{bmatrix}$ |
| 2 | $\Phi_2 = \begin{bmatrix} 1 & 1 & 1 & 1 \\ j & -j & j & -j \end{bmatrix}$ |
| 3 | $\Phi_3 = \begin{bmatrix} 1 & 1 & 1 & 1 \\ -j & j & -j & j \end{bmatrix}$ |
| 4 | $\Phi_4 = \begin{bmatrix} 1 & 1 & 1 & 1 \\ \frac{1+j}{\sqrt{2}} & -\frac{1+j}{\sqrt{2}} & \frac{1+j}{\sqrt{2}} & -\frac{1+j}{\sqrt{2}} \end{bmatrix}$ |
| 5 | $\Phi_5 = \begin{bmatrix} 1 & 1 & 1 & 1 \\ -\frac{1+j}{\sqrt{2}} & \frac{1+j}{\sqrt{2}} & -\frac{1+j}{\sqrt{2}} & \frac{1+j}{\sqrt{2}} \end{bmatrix}$ |
| 6 | $\Phi_6 = \begin{bmatrix} 1 & 1 & 1 & 1 \\ \frac{-1+j}{\sqrt{2}} & \frac{1-j}{\sqrt{2}} & \frac{-1+j}{\sqrt{2}} & \frac{1-j}{\sqrt{2}} \end{bmatrix}$ |
| 7 | $\Phi_7 = \begin{bmatrix} 1 & 1 & 1 & 1 \\ \frac{1-j}{\sqrt{2}} & \frac{-1+j}{\sqrt{2}} & \frac{1-j}{\sqrt{2}} & \frac{-1+j}{\sqrt{2}} \end{bmatrix}$ |

| Index | $w_m$ |
|---|---|
| 0 | $[v_0\ v_1\ v_2\ v_3]$ |
| 1 | $[v_1\ v_2\ v_3\ v_4]$ |
| 2 | $[v_2\ v_3\ v_4\ v_5]$ |
| 3 | $[v_3\ v_4\ v_5\ v_6]$ |
| 4 | $[v_4\ v_5\ v_6\ v_7]$ |
| 5 | $[v_5\ v_6\ v_7\ v_0]$ |
| 6 | $[v_6\ v_7\ v_0\ v_1]$ |
| 7 | $[v_7\ v_0\ v_1\ v_2]$ |

Basic Codebook:

| Index m | Rank1 basic codebook $w_m^1$ | Rank2 basic codebook $w_m^2$ | Rank3 basic codebook $w_m^3$ | Rank4 basic codebook $w_m^4$ |
|---|---|---|---|---|
| 0 | $w_0(:,1)$ | $[w_0(:,1)\ w_0(:,2)]$ | $[w_0(:,1)\ w_0(:,2)\ w_0(:,3)]$ | $w_0$ |
| 1 | $w_1(:,1)$ | $[w_1(:,1)\ w_1(:,2)]$ | $[w_1(:,1)\ w_1(:,2)\ w_1(:,3)]$ | $w_1$ |
| 2 | $w_2(:,1)$ | $[w_2(:,1)\ w_2(:,2)]$ | $[w_2(:,1)\ w_2(:,2)\ w_2(:,3)]$ | $w_2$ |
| 3 | $w_3(:,1)$ | $[w_3(:,1)\ w_3(:,2)]$ | $[w_3(:,1)\ w_3(:,2)\ w_3(:,3)]$ | $w_3$ |
| 4 | $w_4(:,1)$ | $[w_4(:,1)\ w_4(:,2)]$ | $[w_4(:,1)\ w_4(:,2)\ w_4(:,3)]$ | $w_4$ |
| 5 | $w_5(:,1)$ | $[w_5(:,1)\ w_5(:,2)]$ | $[w_5(:,1)\ w_5(:,2)\ w_5(:,3)]$ | $w_5$ |
| 6 | $w_6(:,1)$ | $[w_6(:,1)\ w_6(:,2)]$ | $[w_6(:,1)\ w_6(:,2)\ w_6(:,3)]$ | $w_6$ |
| 7 | $w_7(:,1)$ | $[w_7(:,1)\ w_7(:,2)]$ | $[w_7(:,1)\ w_7(:,2)\ w_7(:,3)]$ | $w_7$ |

Transformation Codebook:

| Index k | Rank1 transformation codebook $\Phi_k^1$ | Rank2 transformation codebook $\Phi_k^2$ | Rank3 transformation codebook $\Phi_k^3$ | Rank4 transformation codebook $\Phi_k^4$ |
|---|---|---|---|---|
| 0 | $\Phi_0(:,1)$ | $[\Phi_0(:,1)\ \Phi_0(:,2)]$ | $[\Phi_0(:,1)\ \Phi_0(:,2)\ \Phi_0(:,3)]$ | $\Phi_0$ |
| 1 | $\Phi_1(:,1)$ | $[\Phi_1(:,1)\ \Phi_1(:,2)]$ | $[\Phi_1(:,1)\ \Phi_1(:,2)\ \Phi_1(:,3)]$ | $\Phi_1$ |

Codebook 2:                                                                 Codebook 3:

| Index | Rank1 codebook | Rank2 codebook | Rank3 codebook | Rank4 codebook |
|---|---|---|---|---|
| 0 | $\begin{bmatrix} v_0 \\ v_0 \end{bmatrix}$ | $\begin{bmatrix} v_0 & v_1 \\ v_0 & -v_1 \end{bmatrix}$ | $\begin{bmatrix} v_0 & v_1 & v_2 \\ v_0 & -v_1 & v_2 \end{bmatrix}$ | $\begin{bmatrix} v_0 & v_1 & v_2 & v_3 \\ v_0 & -v_1 & v_2 & -v_3 \end{bmatrix}$ |
| 1 | $\begin{bmatrix} v_1 \\ v_1 \end{bmatrix}$ | $\begin{bmatrix} v_1 & v_2 \\ v_1 & -v_2 \end{bmatrix}$ | $\begin{bmatrix} v_1 & v_2 & v_3 \\ v_1 & -v_2 & v_3 \end{bmatrix}$ | $\begin{bmatrix} v_1 & v_2 & v_3 & v_4 \\ v_1 & -v_2 & v_3 & -v_4 \end{bmatrix}$ |
| 2 | $\begin{bmatrix} v_2 \\ v_2 \end{bmatrix}$ | $\begin{bmatrix} v_2 & v_3 \\ v_2 & -v_3 \end{bmatrix}$ | $\begin{bmatrix} v_2 & v_3 & v_4 \\ v_2 & -v_3 & v_4 \end{bmatrix}$ | $\begin{bmatrix} v_2 & v_3 & v_4 & v_5 \\ v_2 & -v_3 & v_4 & -v_5 \end{bmatrix}$ |
| 3 | $\begin{bmatrix} v_3 \\ v_3 \end{bmatrix}$ | $\begin{bmatrix} v_3 & v_4 \\ v_3 & -v_4 \end{bmatrix}$ | $\begin{bmatrix} v_3 & v_4 & v_5 \\ v_3 & -v_4 & v_5 \end{bmatrix}$ | $\begin{bmatrix} v_3 & v_4 & v_5 & v_6 \\ v_3 & -v_4 & v_5 & -v_6 \end{bmatrix}$ |
| 4 | $\begin{bmatrix} v_4 \\ v_4 \end{bmatrix}$ | $\begin{bmatrix} v_4 & v_5 \\ v_4 & -v_5 \end{bmatrix}$ | $\begin{bmatrix} v_4 & v_5 & v_6 \\ v_4 & -v_5 & v_6 \end{bmatrix}$ | $\begin{bmatrix} v_4 & v_5 & v_6 & v_7 \\ v_4 & -v_5 & v_6 & -v_7 \end{bmatrix}$ |
| 5 | $\begin{bmatrix} v_5 \\ v_5 \end{bmatrix}$ | $\begin{bmatrix} v_5 & v_6 \\ v_5 & -v_6 \end{bmatrix}$ | $\begin{bmatrix} v_5 & v_6 & v_7 \\ v_5 & -v_6 & v_7 \end{bmatrix}$ | $\begin{bmatrix} v_5 & v_6 & v_7 & v_0 \\ v_5 & -v_6 & v_7 & -v_0 \end{bmatrix}$ |
| 6 | $\begin{bmatrix} v_6 \\ v_6 \end{bmatrix}$ | $\begin{bmatrix} v_6 & v_7 \\ v_6 & -v_7 \end{bmatrix}$ | $\begin{bmatrix} v_6 & v_7 & v_0 \\ v_6 & -v_7 & v_0 \end{bmatrix}$ | $\begin{bmatrix} v_6 & v_7 & v_0 & v_1 \\ v_6 & -v_7 & v_0 & -v_1 \end{bmatrix}$ |
| 7 | $\begin{bmatrix} v_7 \\ v_7 \end{bmatrix}$ | $\begin{bmatrix} v_7 & v_0 \\ v_7 & -v_0 \end{bmatrix}$ | $\begin{bmatrix} v_7 & v_0 & v_1 \\ v_7 & -v_0 & v_1 \end{bmatrix}$ | $\begin{bmatrix} v_7 & v_0 & v_1 & v_2 \\ v_7 & -v_0 & v_1 & -v_2 \end{bmatrix}$ |
| 8 | $\begin{bmatrix} v_0 \\ -v_0 \end{bmatrix}$ | $\begin{bmatrix} v_0 & v_1 \\ -v_0 & v_1 \end{bmatrix}$ | $\begin{bmatrix} v_0 & v_1 & v_2 \\ -v_0 & v_1 & -v_2 \end{bmatrix}$ | $\begin{bmatrix} v_0 & v_1 & v_2 & v_3 \\ -v_0 & v_1 & -v_2 & v_3 \end{bmatrix}$ |
| 9 | $\begin{bmatrix} v_1 \\ -v_1 \end{bmatrix}$ | $\begin{bmatrix} v_1 & v_2 \\ -v_1 & v_2 \end{bmatrix}$ | $\begin{bmatrix} v_1 & v_2 & v_3 \\ -v_1 & v_2 & -v_3 \end{bmatrix}$ | $\begin{bmatrix} v_1 & v_2 & v_3 & v_4 \\ -v_1 & v_2 & -v_3 & v_4 \end{bmatrix}$ |
| 10 | $\begin{bmatrix} v_2 \\ -v_2 \end{bmatrix}$ | $\begin{bmatrix} v_2 & v_3 \\ -v_2 & v_3 \end{bmatrix}$ | $\begin{bmatrix} v_2 & v_3 & v_4 \\ -v_2 & v_3 & -v_4 \end{bmatrix}$ | $\begin{bmatrix} v_2 & v_3 & v_4 & v_5 \\ -v_2 & v_3 & -v_4 & v_5 \end{bmatrix}$ |
| 11 | $\begin{bmatrix} v_3 \\ -v_3 \end{bmatrix}$ | $\begin{bmatrix} v_3 & v_4 \\ -v_3 & v_4 \end{bmatrix}$ | $\begin{bmatrix} v_3 & v_4 & v_5 \\ -v_3 & v_4 & -v_5 \end{bmatrix}$ | $\begin{bmatrix} v_3 & v_4 & v_5 & v_6 \\ -v_3 & v_4 & -v_5 & v_6 \end{bmatrix}$ |
| 12 | $\begin{bmatrix} v_4 \\ -v_4 \end{bmatrix}$ | $\begin{bmatrix} v_4 & v_5 \\ -v_4 & v_5 \end{bmatrix}$ | $\begin{bmatrix} v_4 & v_5 & v_6 \\ -v_4 & v_5 & -v_6 \end{bmatrix}$ | $\begin{bmatrix} v_4 & v_5 & v_6 & v_7 \\ -v_4 & v_5 & -v_6 & v_7 \end{bmatrix}$ |
| 13 | $\begin{bmatrix} v_5 \\ -v_5 \end{bmatrix}$ | $\begin{bmatrix} v_5 & v_6 \\ -v_5 & v_6 \end{bmatrix}$ | $\begin{bmatrix} v_5 & v_6 & v_7 \\ -v_5 & v_6 & -v_7 \end{bmatrix}$ | $\begin{bmatrix} v_5 & v_6 & v_7 & v_0 \\ -v_5 & v_6 & -v_7 & v_0 \end{bmatrix}$ |
| 14 | $\begin{bmatrix} v_6 \\ -v_6 \end{bmatrix}$ | $\begin{bmatrix} v_6 & v_7 \\ -v_6 & v_7 \end{bmatrix}$ | $\begin{bmatrix} v_6 & v_7 & v_0 \\ -v_6 & v_7 & -v_0 \end{bmatrix}$ | $\begin{bmatrix} v_6 & v_7 & v_0 & v_1 \\ -v_6 & v_7 & -v_0 & v_1 \end{bmatrix}$ |
| 15 | $\begin{bmatrix} v_7 \\ -v_7 \end{bmatrix}$ | $\begin{bmatrix} v_7 & v_0 \\ -v_7 & v_0 \end{bmatrix}$ | $\begin{bmatrix} v_7 & v_0 & v_1 \\ -v_7 & v_0 & -v_1 \end{bmatrix}$ | $\begin{bmatrix} v_7 & v_0 & v_1 & v_2 \\ -v_7 & v_0 & -v_1 & v_2 \end{bmatrix}$ |

The codebook 3 is structured substantially the same as the codebook 2.

Basic Codebook:

| Index m | Rank1 basic codebook $w_m^1$ | Rank2 basic codebook $w_m^2$ | Rank3 basic codebook $w_m^3$ | Rank4 basic codebook $w_m^4$ |
|---|---|---|---|---|
| 0 | $w_0(:,1)$ | $[w_0(:,1)\ w_0(:,2)]$ | $[w_0(:,1)\ w_0(:,2)\ w_0(:,3)]$ | $w_0$ |
| 1 | $w_1(:,1)$ | $[w_1(:,1)\ w_1(:,2)]$ | $[w_1(:,1)\ w_1(:,2)\ w_1(:,3)]$ | $w_1$ |
| 2 | $w_2(:,1)$ | $[w_2(:,1)\ w_2(:,2)]$ | $[w_2(:,1)\ w_2(:,2)\ w_2(:,3)]$ | $w_2$ |
| 3 | $w_3(:,1)$ | $[w_3(:,1)\ w_3(:,2)]$ | $[w_3(:,1)\ w_3(:,2)\ w_3(:,3)]$ | $w_3$ |
| 4 | $w_4(:,1)$ | $[w_4(:,1)\ w_4(:,2)]$ | $[w_4(:,1)\ w_4(:,2)\ w_4(:,3)]$ | $w_4$ |
| 5 | $w_5(:,1)$ | $[w_5(:,1)\ w_5(:,2)]$ | $[w_5(:,1)\ w_5(:,2)\ w_5(:,3)]$ | $w_5$ |
| 6 | $w_6(:,1)$ | $[w_6(:,1)\ w_6(:,2)]$ | $[w_6(:,1)\ w_6(:,2)\ w_6(:,3)]$ | $w_6$ |
| 7 | $w_7(:,1)$ | $[w_7(:,1)\ w_7(:,2)]$ | $[w_7(:,1)\ w_7(:,2)\ w_7(:,3)]$ | $w_7$ |

Transformation Codebook:

| Index k | Rank1 transformation codebook $\Phi_k^1$ | Rank2 transformation codebook $\Phi_k^2$ | Rank3 transformation codebook $\Phi_k^3$ | Rank4 transformation codebook $\Phi_k^4$ |
|---|---|---|---|---|
| 0 | $\Phi_0(:,1)$ | $[\Phi_0(:,1)\ \Phi_0(:,2)]$ | $[\Phi_0(:,1)\ \Phi_0(:,2)\ \Phi_0(:,3)]$ | $\Phi_0$ |
| 1 | $\Phi_1(:,1)$ | $[\Phi_1(:,1)\ \Phi_1(:,2)]$ | $[\Phi_1(:,1)\ \Phi_1(:,2)\ \Phi_1(:,3)]$ | $\Phi_1$ |
| 2 | $\Phi_2(:,1)$ | $[\Phi_2(:,1)\ \Phi_2(:,2)]$ | $[\Phi_2(:,1)\ \Phi_2(:,2)\ \Phi_2(:,3)]$ | $\Phi_2$ |
| 3 | $\Phi_3(:,1)$ | $[\Phi_3(:,1)\ \Phi_3(:,2)]$ | $[\Phi_3(:,1)\ \Phi_3(:,2)\ \Phi_3(:,3)]$ | $\Phi_3$ |

Codebook 3:

| Index | Rank1 codebook | Rank2 codebook | Rank3 codebook | Rank4 codebook |
|---|---|---|---|---|
| 0 | $\begin{bmatrix} v_0 \\ v_0 \end{bmatrix}$ | $\begin{bmatrix} v_0 & v_1 \\ v_0 & -v_1 \end{bmatrix}$ | $\begin{bmatrix} v_0 & v_1 & v_2 \\ v_0 & -v_1 & v_2 \end{bmatrix}$ | $\begin{bmatrix} v_0 & v_1 & v_2 & v_3 \\ v_0 & -v_1 & v_2 & -v_3 \end{bmatrix}$ |
| 1 | $\begin{bmatrix} v_1 \\ v_1 \end{bmatrix}$ | $\begin{bmatrix} v_1 & v_2 \\ v_1 & -v_2 \end{bmatrix}$ | $\begin{bmatrix} v_1 & v_2 & v_3 \\ v_1 & -v_2 & v_3 \end{bmatrix}$ | $\begin{bmatrix} v_1 & v_2 & v_3 & v_4 \\ v_1 & -v_2 & v_3 & -v_4 \end{bmatrix}$ |
| 2 | $\begin{bmatrix} v_2 \\ v_2 \end{bmatrix}$ | $\begin{bmatrix} v_2 & v_3 \\ v_2 & -v_3 \end{bmatrix}$ | $\begin{bmatrix} v_2 & v_3 & v_4 \\ v_2 & -v_3 & v_4 \end{bmatrix}$ | $\begin{bmatrix} v_2 & v_3 & v_4 & v_5 \\ v_2 & -v_3 & v_4 & -v_5 \end{bmatrix}$ |
| 3 | $\begin{bmatrix} v_3 \\ v_3 \end{bmatrix}$ | $\begin{bmatrix} v_3 & v_4 \\ v_3 & -v_4 \end{bmatrix}$ | $\begin{bmatrix} v_3 & v_4 & v_5 \\ v_3 & -v_4 & v_5 \end{bmatrix}$ | $\begin{bmatrix} v_3 & v_4 & v_5 & v_6 \\ v_3 & -v_4 & v_5 & -v_6 \end{bmatrix}$ |
| 4 | $\begin{bmatrix} v_4 \\ v_4 \end{bmatrix}$ | $\begin{bmatrix} v_4 & v_5 \\ v_4 & -v_5 \end{bmatrix}$ | $\begin{bmatrix} v_4 & v_5 & v_6 \\ v_4 & -v_5 & v_6 \end{bmatrix}$ | $\begin{bmatrix} v_4 & v_5 & v_6 & v_7 \\ v_4 & -v_5 & v_6 & -v_7 \end{bmatrix}$ |
| 5 | $\begin{bmatrix} v_5 \\ v_5 \end{bmatrix}$ | $\begin{bmatrix} v_5 & v_6 \\ v_5 & -v_6 \end{bmatrix}$ | $\begin{bmatrix} v_5 & v_6 & v_7 \\ v_5 & -v_6 & v_7 \end{bmatrix}$ | $\begin{bmatrix} v_5 & v_6 & v_7 & v_0 \\ v_5 & -v_6 & v_7 & -v_0 \end{bmatrix}$ |
| 6 | $\begin{bmatrix} v_6 \\ v_6 \end{bmatrix}$ | $\begin{bmatrix} v_6 & v_7 \\ v_6 & -v_7 \end{bmatrix}$ | $\begin{bmatrix} v_6 & v_7 & v_0 \\ v_6 & -v_7 & v_0 \end{bmatrix}$ | $\begin{bmatrix} v_6 & v_7 & v_0 & v_1 \\ v_6 & -v_7 & v_0 & -v_1 \end{bmatrix}$ |
| 7 | $\begin{bmatrix} v_7 \\ v_7 \end{bmatrix}$ | $\begin{bmatrix} v_7 & v_0 \\ v_7 & -v_0 \end{bmatrix}$ | $\begin{bmatrix} v_7 & v_0 & v_1 \\ v_7 & -v_0 & v_1 \end{bmatrix}$ | $\begin{bmatrix} v_7 & v_0 & v_1 & v_2 \\ v_7 & -v_0 & v_1 & -v_2 \end{bmatrix}$ |
| 8 | $\begin{bmatrix} v_0 \\ -v_0 \end{bmatrix}$ | $\begin{bmatrix} v_0 & v_1 \\ -v_0 & v_1 \end{bmatrix}$ | $\begin{bmatrix} v_0 & v_1 & v_2 \\ -v_0 & v_1 & -v_2 \end{bmatrix}$ | $\begin{bmatrix} v_0 & v_1 & v_2 & v_3 \\ -v_0 & v_1 & -v_2 & v_3 \end{bmatrix}$ |
| 9 | $\begin{bmatrix} v_1 \\ -v_1 \end{bmatrix}$ | $\begin{bmatrix} v_1 & v_2 \\ -v_1 & v_2 \end{bmatrix}$ | $\begin{bmatrix} v_1 & v_2 & v_3 \\ -v_1 & v_2 & -v_3 \end{bmatrix}$ | $\begin{bmatrix} v_1 & v_2 & v_3 & v_4 \\ -v_1 & v_2 & -v_3 & v_4 \end{bmatrix}$ |
| 10 | $\begin{bmatrix} v_2 \\ -v_2 \end{bmatrix}$ | $\begin{bmatrix} v_2 & v_3 \\ -v_2 & v_3 \end{bmatrix}$ | $\begin{bmatrix} v_2 & v_3 & v_4 \\ -v_2 & v_3 & -v_4 \end{bmatrix}$ | $\begin{bmatrix} v_2 & v_3 & v_4 & v_5 \\ -v_2 & v_3 & -v_4 & v_5 \end{bmatrix}$ |
| 11 | $\begin{bmatrix} v_3 \\ -v_3 \end{bmatrix}$ | $\begin{bmatrix} v_3 & v_4 \\ -v_3 & v_4 \end{bmatrix}$ | $\begin{bmatrix} v_3 & v_4 & v_5 \\ -v_3 & v_4 & -v_5 \end{bmatrix}$ | $\begin{bmatrix} v_3 & v_4 & v_5 & v_6 \\ -v_3 & v_4 & -v_5 & v_6 \end{bmatrix}$ |

-continued

| Index | Rank1 codebook | Rank2 codebook | Rank3 codebook | Rank4 codebook |
|---|---|---|---|---|
| 12 | $\begin{bmatrix} v_4 \\ -v_4 \end{bmatrix}$ | $\begin{bmatrix} v_4 & v_5 \\ -v_4 & v_5 \end{bmatrix}$ | $\begin{bmatrix} v_4 & v_5 & v_6 \\ -v_4 & v_5 & -v_6 \end{bmatrix}$ | $\begin{bmatrix} v_4 & v_5 & v_6 & v_7 \\ -v_4 & v_5 & -v_6 & v_7 \end{bmatrix}$ |
| 13 | $\begin{bmatrix} v_5 \\ -v_5 \end{bmatrix}$ | $\begin{bmatrix} v_5 & v_6 \\ -v_5 & v_6 \end{bmatrix}$ | $\begin{bmatrix} v_5 & v_6 & v_7 \\ -v_5 & v_6 & -v_7 \end{bmatrix}$ | $\begin{bmatrix} v_5 & v_6 & v_7 & v_0 \\ -v_5 & v_6 & -v_7 & v_0 \end{bmatrix}$ |
| 14 | $\begin{bmatrix} v_6 \\ -v_6 \end{bmatrix}$ | $\begin{bmatrix} v_6 & v_7 \\ -v_6 & v_7 \end{bmatrix}$ | $\begin{bmatrix} v_6 & v_7 & v_0 \\ -v_6 & v_7 & -v_0 \end{bmatrix}$ | $\begin{bmatrix} v_6 & v_7 & v_0 & v_1 \\ -v_6 & v_7 & -v_0 & v_1 \end{bmatrix}$ |
| 15 | $\begin{bmatrix} v_7 \\ -v_7 \end{bmatrix}$ | $\begin{bmatrix} v_7 & v_0 \\ -v_7 & v_0 \end{bmatrix}$ | $\begin{bmatrix} v_7 & v_0 & v_1 \\ -v_7 & v_0 & -v_1 \end{bmatrix}$ | $\begin{bmatrix} v_7 & v_0 & v_1 & v_2 \\ -v_7 & v_0 & -v_1 & v_2 \end{bmatrix}$ |
| 16 | $\begin{bmatrix} v_0 \\ jv_0 \end{bmatrix}$ | $\begin{bmatrix} v_0 & v_1 \\ jv_0 & -jv_1 \end{bmatrix}$ | $\begin{bmatrix} v_0 & v_1 & v_2 \\ jv_0 & -jv_1 & jv_2 \end{bmatrix}$ | $\begin{bmatrix} v_0 & v_1 & v_2 & v_3 \\ jv_0 & -jv_1 & jv_2 & -jv_3 \end{bmatrix}$ |
| 17 | $\begin{bmatrix} v_1 \\ jv_1 \end{bmatrix}$ | $\begin{bmatrix} v_1 & v_2 \\ jv_1 & -jv_2 \end{bmatrix}$ | $\begin{bmatrix} v_1 & v_2 & v_3 \\ jv_1 & -jv_2 & jv_3 \end{bmatrix}$ | $\begin{bmatrix} v_1 & v_2 & v_3 & v_4 \\ jv_1 & -jv_2 & jv_3 & -jv_4 \end{bmatrix}$ |
| 18 | $\begin{bmatrix} v_2 \\ jv_2 \end{bmatrix}$ | $\begin{bmatrix} v_2 & v_3 \\ jv_2 & -jv_3 \end{bmatrix}$ | $\begin{bmatrix} v_2 & v_3 & v_4 \\ jv_2 & -jv_3 & jv_4 \end{bmatrix}$ | $\begin{bmatrix} v_2 & v_3 & v_4 & v_5 \\ jv_2 & -jv_3 & jv_4 & -jv_5 \end{bmatrix}$ |
| 19 | $\begin{bmatrix} v_3 \\ jv_3 \end{bmatrix}$ | $\begin{bmatrix} v_3 & v_4 \\ jv_3 & -jv_4 \end{bmatrix}$ | $\begin{bmatrix} v_3 & v_4 & v_5 \\ jv_3 & -jv_4 & jv_5 \end{bmatrix}$ | $\begin{bmatrix} v_3 & v_4 & v_5 & v_6 \\ jv_3 & -jv_4 & jv_5 & -jv_6 \end{bmatrix}$ |
| 20 | $\begin{bmatrix} v_4 \\ jv_4 \end{bmatrix}$ | $\begin{bmatrix} v_4 & v_5 \\ jv_4 & -jv_5 \end{bmatrix}$ | $\begin{bmatrix} v_4 & v_5 & v_6 \\ jv_4 & -jv_5 & jv_6 \end{bmatrix}$ | $\begin{bmatrix} v_4 & v_5 & v_6 & v_7 \\ jv_4 & -jv_5 & jv_6 & -jv_7 \end{bmatrix}$ |
| 21 | $\begin{bmatrix} v_5 \\ jv_5 \end{bmatrix}$ | $\begin{bmatrix} v_5 & v_6 \\ jv_5 & -jv_6 \end{bmatrix}$ | $\begin{bmatrix} v_5 & v_6 & v_7 \\ jv_5 & -jv_6 & jv_7 \end{bmatrix}$ | $\begin{bmatrix} v_5 & v_6 & v_7 & v_0 \\ jv_5 & -jv_6 & jv_7 & -jv_0 \end{bmatrix}$ |
| 22 | $\begin{bmatrix} v_6 \\ jv_6 \end{bmatrix}$ | $\begin{bmatrix} v_6 & v_7 \\ jv_6 & -jv_7 \end{bmatrix}$ | $\begin{bmatrix} v_6 & v_7 & v_0 \\ jv_6 & -jv_7 & jv_0 \end{bmatrix}$ | $\begin{bmatrix} v_6 & v_7 & v_0 & v_1 \\ jv_6 & -jv_7 & jv_0 & -jv_1 \end{bmatrix}$ |
| 23 | $\begin{bmatrix} v_7 \\ jv_7 \end{bmatrix}$ | $\begin{bmatrix} v_7 & v_0 \\ jv_7 & -jv_0 \end{bmatrix}$ | $\begin{bmatrix} v_7 & v_0 & v_1 \\ jv_7 & -jv_0 & jv_1 \end{bmatrix}$ | $\begin{bmatrix} v_7 & v_0 & v_1 & v_2 \\ jv_7 & -jv_0 & jv_1 & -jv_2 \end{bmatrix}$ |
| 24 | $\begin{bmatrix} v_0 \\ -jv_0 \end{bmatrix}$ | $\begin{bmatrix} v_0 & v_1 \\ -jv_0 & jv_1 \end{bmatrix}$ | $\begin{bmatrix} v_0 & v_1 & v_2 \\ -jv_0 & jv_1 & -jv_2 \end{bmatrix}$ | $\begin{bmatrix} v_0 & v_1 & v_2 & v_3 \\ -jv_0 & jv_1 & -jv_2 & jv_3 \end{bmatrix}$ |
| 25 | $\begin{bmatrix} v_1 \\ -jv_1 \end{bmatrix}$ | $\begin{bmatrix} v_1 & v_2 \\ -jv_1 & jv_2 \end{bmatrix}$ | $\begin{bmatrix} v_1 & v_2 & v_3 \\ -jv_1 & jv_2 & -jv_3 \end{bmatrix}$ | $\begin{bmatrix} v_1 & v_2 & v_3 & v_4 \\ -jv_1 & jv_2 & -jv_3 & jv_4 \end{bmatrix}$ |
| 26 | $\begin{bmatrix} v_2 \\ -jv_2 \end{bmatrix}$ | $\begin{bmatrix} v_2 & v_3 \\ -jv_2 & jv_3 \end{bmatrix}$ | $\begin{bmatrix} v_2 & v_3 & v_4 \\ -jv_2 & jv_3 & -jv_4 \end{bmatrix}$ | $\begin{bmatrix} v_2 & v_3 & v_4 & v_5 \\ -jv_2 & jv_3 & -jv_4 & jv_5 \end{bmatrix}$ |
| 27 | $\begin{bmatrix} v_3 \\ -jv_3 \end{bmatrix}$ | $\begin{bmatrix} v_3 & v_4 \\ -jv_3 & jv_4 \end{bmatrix}$ | $\begin{bmatrix} v_3 & v_4 & v_5 \\ -jv_3 & jv_4 & -jv_5 \end{bmatrix}$ | $\begin{bmatrix} v_3 & v_4 & v_5 & v_6 \\ -jv_3 & jv_4 & -jv_5 & jv_6 \end{bmatrix}$ |
| 28 | $\begin{bmatrix} v_4 \\ -jv_4 \end{bmatrix}$ | $\begin{bmatrix} v_4 & v_5 \\ -jv_4 & jv_5 \end{bmatrix}$ | $\begin{bmatrix} v_4 & v_5 & v_6 \\ -jv_4 & jv_5 & -jv_6 \end{bmatrix}$ | $\begin{bmatrix} v_4 & v_5 & v_6 & v_7 \\ -jv_4 & jv_5 & -jv_6 & jv_7 \end{bmatrix}$ |
| 29 | $\begin{bmatrix} v_5 \\ -jv_5 \end{bmatrix}$ | $\begin{bmatrix} v_5 & v_6 \\ -jv_5 & jv_6 \end{bmatrix}$ | $\begin{bmatrix} v_5 & v_6 & v_7 \\ -jv_5 & jv_6 & -jv_7 \end{bmatrix}$ | $\begin{bmatrix} v_5 & v_6 & v_7 & v_0 \\ -jv_5 & jv_6 & -jv_7 & jv_0 \end{bmatrix}$ |
| 30 | $\begin{bmatrix} v_6 \\ -jv_6 \end{bmatrix}$ | $\begin{bmatrix} v_6 & v_7 \\ -jv_6 & jv_7 \end{bmatrix}$ | $\begin{bmatrix} v_6 & v_7 & v_0 \\ -jv_6 & jv_7 & -jv_0 \end{bmatrix}$ | $\begin{bmatrix} v_6 & v_7 & v_0 & v_1 \\ -jv_6 & jv_7 & -jv_0 & jv_1 \end{bmatrix}$ |

-continued

| Index | Rank1 codebook | Rank2 codebook | Rank3 codebook | Rank4 codebook |
|---|---|---|---|---|
| 31 | $\begin{bmatrix} v_7 \\ -jv_7 \end{bmatrix}$ | $\begin{bmatrix} v_7 & v_0 \\ -jv_7 & jv_0 \end{bmatrix}$ | $\begin{bmatrix} v_7 & v_0 & v_1 \\ -jv_7 & jv_0 & -jv_1 \end{bmatrix}$ | $\begin{bmatrix} v_7 & v_0 & v_1 & v_2 \\ -jv_7 & jv_0 & -jv_1 & jv_2 \end{bmatrix}$ |

In other embodiments of the invention, codebooks resulting from column-exchange of the foregoing codebooks can also be applied in the invention. For example:

Codebook 4 (Resulting from Column-Exchange of the Codebook 1):

| Index | Rank3 codebook | Rank4 codebook |
|---|---|---|
| 0 | $\begin{bmatrix} v_0 & \sqrt{2}\,v_6 & 0 \\ v_0 & 0 & \sqrt{2}\,v_6 \end{bmatrix}$ | $\begin{bmatrix} v_0 & 0 & v_6 & 0 \\ 0 & v_0 & 0 & v_6 \end{bmatrix}$ |
| 1 | $\begin{bmatrix} v_1 & \sqrt{2}\,v_7 & 0 \\ v_1 & 0 & \sqrt{2}\,v_7 \end{bmatrix}$ | $\begin{bmatrix} v_1 & 0 & v_7 & 0 \\ 0 & v_1 & 0 & v_7 \end{bmatrix}$ |
| 2 | $\begin{bmatrix} v_2 & \sqrt{2}\,v_0 & 0 \\ v_2 & 0 & \sqrt{2}\,v_0 \end{bmatrix}$ | $\begin{bmatrix} v_2 & 0 & v_0 & 0 \\ 0 & v_2 & 0 & v_0 \end{bmatrix}$ |
| 3 | $\begin{bmatrix} v_3 & \sqrt{2}\,v_1 & 0 \\ v_3 & 0 & \sqrt{2}\,v_1 \end{bmatrix}$ | $\begin{bmatrix} v_3 & 0 & v_1 & 0 \\ 0 & v_3 & 0 & v_1 \end{bmatrix}$ |
| 4 | $\begin{bmatrix} v_4 & \sqrt{2}\,v_2 & 0 \\ v_4 & 0 & \sqrt{2}\,v_2 \end{bmatrix}$ | $\begin{bmatrix} v_4 & 0 & v_2 & 0 \\ 0 & v_4 & 0 & v_2 \end{bmatrix}$ |
| 5 | $\begin{bmatrix} v_5 & \sqrt{2}\,v_3 & 0 \\ v_5 & 0 & \sqrt{2}\,v_3 \end{bmatrix}$ | $\begin{bmatrix} v_5 & 0 & v_3 & 0 \\ 0 & v_5 & 0 & v_3 \end{bmatrix}$ |
| 6 | $\begin{bmatrix} v_6 & \sqrt{2}\,v_4 & 0 \\ v_6 & 0 & \sqrt{2}\,v_4 \end{bmatrix}$ | $\begin{bmatrix} v_6 & 0 & v_4 & 0 \\ 0 & v_6 & 0 & v_4 \end{bmatrix}$ |
| 7 | $\begin{bmatrix} v_7 & \sqrt{2}\,v_5 & 0 \\ v_7 & 0 & \sqrt{2}\,v_5 \end{bmatrix}$ | $\begin{bmatrix} v_7 & 0 & v_5 & 0 \\ 0 & v_7 & 0 & v_5 \end{bmatrix}$ |
| 8 | $\begin{bmatrix} v_0 & v_6 & v_6 \\ v_0 & v_6 & -v_6 \end{bmatrix}$ | $\begin{bmatrix} v_6 & v_0 & v_6 & v_0 \\ v_6 & v_0 & -v_6 & -v_0 \end{bmatrix}$ |
| 9 | $\begin{bmatrix} v_1 & v_7 & v_7 \\ v_1 & v_7 & -v_7 \end{bmatrix}$ | $\begin{bmatrix} v_7 & v_1 & v_7 & v_1 \\ v_7 & v_1 & -v_7 & -v_1 \end{bmatrix}$ |
| 10 | $\begin{bmatrix} v_2 & v_0 & v_0 \\ v_2 & v_0 & -v_0 \end{bmatrix}$ | $\begin{bmatrix} v_0 & v_2 & v_0 & v_2 \\ v_0 & v_2 & -v_0 & -v_2 \end{bmatrix}$ |
| 11 | $\begin{bmatrix} v_3 & v_1 & v_1 \\ v_3 & v_1 & -v_1 \end{bmatrix}$ | $\begin{bmatrix} v_1 & v_3 & v_1 & v_3 \\ v_1 & v_3 & -v_1 & -v_3 \end{bmatrix}$ |
| 12 | $\begin{bmatrix} v_4 & v_2 & v_2 \\ v_4 & v_2 & -v_2 \end{bmatrix}$ | $\begin{bmatrix} v_2 & v_4 & v_2 & v_4 \\ v_2 & v_4 & -v_2 & -v_4 \end{bmatrix}$ |
| 13 | $\begin{bmatrix} v_5 & v_3 & v_3 \\ v_5 & v_3 & -v_3 \end{bmatrix}$ | $\begin{bmatrix} v_3 & v_5 & v_3 & v_5 \\ v_3 & v_5 & -v_3 & -v_5 \end{bmatrix}$ |
| 14 | $\begin{bmatrix} v_6 & v_4 & v_4 \\ v_6 & v_4 & -v_4 \end{bmatrix}$ | $\begin{bmatrix} v_4 & v_6 & v_4 & v_6 \\ v_4 & v_6 & -v_4 & -v_6 \end{bmatrix}$ |
| 15 | $\begin{bmatrix} v_7 & v_5 & v_5 \\ v_7 & v_5 & -v_5 \end{bmatrix}$ | $\begin{bmatrix} v_5 & v_7 & v_5 & v_7 \\ v_5 & v_7 & -v_5 & -v_7 \end{bmatrix}$ |

Codebook 5 (Resulting from Column-Exchange of the Codebook 2):

| Index | Rank1 codebook | Rank2 codebook | Rank3 codebook | Rank4 codebook |
|---|---|---|---|---|
| 0 | $\begin{bmatrix} v_0 \\ v_0 \end{bmatrix}$ | $\begin{bmatrix} v_0 & v_1 \\ v_0 & -v_1 \end{bmatrix}$ | $\begin{bmatrix} v_0 & v_1 & v_2 \\ v_0 & -v_1 & v_2 \end{bmatrix}$ | $\begin{bmatrix} v_0 & v_1 & v_2 & v_3 \\ v_0 & -v_1 & v_2 & -v_3 \end{bmatrix}$ |
| 1 | $\begin{bmatrix} v_1 \\ v_1 \end{bmatrix}$ | $\begin{bmatrix} v_1 & v_2 \\ v_1 & -v_2 \end{bmatrix}$ | $\begin{bmatrix} v_1 & v_2 & v_3 \\ v_1 & -v_2 & v_3 \end{bmatrix}$ | $\begin{bmatrix} v_1 & v_2 & v_3 & v_4 \\ v_1 & -v_2 & v_3 & -v_4 \end{bmatrix}$ |
| 2 | $\begin{bmatrix} v_2 \\ v_2 \end{bmatrix}$ | $\begin{bmatrix} v_2 & v_3 \\ v_2 & -v_3 \end{bmatrix}$ | $\begin{bmatrix} v_2 & v_3 & v_4 \\ v_2 & -v_3 & v_4 \end{bmatrix}$ | $\begin{bmatrix} v_2 & v_3 & v_4 & v_5 \\ v_2 & -v_3 & v_4 & -v_5 \end{bmatrix}$ |
| 3 | $\begin{bmatrix} v_3 \\ v_3 \end{bmatrix}$ | $\begin{bmatrix} v_3 & v_4 \\ v_3 & -v_4 \end{bmatrix}$ | $\begin{bmatrix} v_3 & v_4 & v_5 \\ v_3 & -v_4 & v_5 \end{bmatrix}$ | $\begin{bmatrix} v_3 & v_4 & v_5 & v_6 \\ v_3 & -v_4 & v_5 & -v_6 \end{bmatrix}$ |
| 4 | $\begin{bmatrix} v_4 \\ v_4 \end{bmatrix}$ | $\begin{bmatrix} v_4 & v_5 \\ v_4 & -v_5 \end{bmatrix}$ | $\begin{bmatrix} v_4 & v_5 & v_6 \\ v_4 & -v_5 & v_6 \end{bmatrix}$ | $\begin{bmatrix} v_4 & v_5 & v_6 & v_7 \\ v_4 & -v_5 & v_6 & -v_7 \end{bmatrix}$ |
| 5 | $\begin{bmatrix} v_5 \\ v_5 \end{bmatrix}$ | $\begin{bmatrix} v_5 & v_6 \\ v_5 & -v_6 \end{bmatrix}$ | $\begin{bmatrix} v_5 & v_6 & v_7 \\ v_5 & -v_6 & v_7 \end{bmatrix}$ | $\begin{bmatrix} v_5 & v_6 & v_7 & v_0 \\ v_5 & -v_6 & v_7 & -v_0 \end{bmatrix}$ |
| 6 | $\begin{bmatrix} v_6 \\ v_6 \end{bmatrix}$ | $\begin{bmatrix} v_6 & v_7 \\ v_6 & -v_7 \end{bmatrix}$ | $\begin{bmatrix} v_6 & v_7 & v_0 \\ v_6 & -v_7 & v_0 \end{bmatrix}$ | $\begin{bmatrix} v_6 & v_7 & v_0 & v_1 \\ v_6 & -v_7 & v_0 & -v_1 \end{bmatrix}$ |
| 7 | $\begin{bmatrix} v_7 \\ v_7 \end{bmatrix}$ | $\begin{bmatrix} v_7 & v_0 \\ v_7 & -v_0 \end{bmatrix}$ | $\begin{bmatrix} v_7 & v_0 & v_1 \\ v_7 & -v_0 & v_1 \end{bmatrix}$ | $\begin{bmatrix} v_7 & v_0 & v_1 & v_2 \\ v_7 & -v_0 & v_1 & -v_2 \end{bmatrix}$ |
| 8 | $\begin{bmatrix} v_0 \\ -v_0 \end{bmatrix}$ | $\begin{bmatrix} v_1 & v_0 \\ v_1 & -v_0 \end{bmatrix}$ | $\begin{bmatrix} v_0 & v_1 & v_2 \\ -v_0 & v_1 & -v_2 \end{bmatrix}$ | $\begin{bmatrix} v_0 & v_1 & v_2 & v_3 \\ -v_0 & v_1 & -v_2 & v_3 \end{bmatrix}$ |
| 9 | $\begin{bmatrix} v_1 \\ -v_1 \end{bmatrix}$ | $\begin{bmatrix} v_2 & v_1 \\ v_2 & -v_1 \end{bmatrix}$ | $\begin{bmatrix} v_1 & v_2 & v_3 \\ -v_1 & v_2 & -v_3 \end{bmatrix}$ | $\begin{bmatrix} v_1 & v_2 & v_3 & v_4 \\ -v_1 & v_2 & -v_3 & v_4 \end{bmatrix}$ |
| 10 | $\begin{bmatrix} v_2 \\ -v_2 \end{bmatrix}$ | $\begin{bmatrix} v_3 & v_2 \\ v_3 & -v_2 \end{bmatrix}$ | $\begin{bmatrix} v_2 & v_3 & v_4 \\ -v_2 & v_3 & -v_4 \end{bmatrix}$ | $\begin{bmatrix} v_2 & v_3 & v_4 & v_5 \\ -v_2 & v_3 & -v_4 & v_5 \end{bmatrix}$ |
| 11 | $\begin{bmatrix} v_3 \\ -v_3 \end{bmatrix}$ | $\begin{bmatrix} v_4 & v_3 \\ v_4 & -v_3 \end{bmatrix}$ | $\begin{bmatrix} v_3 & v_4 & v_5 \\ -v_3 & v_4 & -v_5 \end{bmatrix}$ | $\begin{bmatrix} v_3 & v_4 & v_5 & v_6 \\ -v_3 & v_4 & -v_5 & v_6 \end{bmatrix}$ |

-continued

| Index | Rank1 codebook | Rank2 codebook | Rank3 codebook | Rank4 codebook |
|---|---|---|---|---|
| 12 | $\begin{bmatrix} v_4 \\ -v_4 \end{bmatrix}$ | $\begin{bmatrix} v_5 & v_4 \\ v_5 & -v_4 \end{bmatrix}$ | $\begin{bmatrix} v_4 & v_5 & v_6 \\ -v_4 & v_5 & -v_6 \end{bmatrix}$ | $\begin{bmatrix} v_4 & v_5 & v_6 & v_7 \\ -v_4 & v_5 & -v_6 & v_7 \end{bmatrix}$ |
| 13 | $\begin{bmatrix} v_5 \\ -v_5 \end{bmatrix}$ | $\begin{bmatrix} v_6 & v_5 \\ v_6 & -v_5 \end{bmatrix}$ | $\begin{bmatrix} v_5 & v_6 & v_7 \\ -v_5 & v_6 & -v_7 \end{bmatrix}$ | $\begin{bmatrix} v_5 & v_6 & v_7 & v_0 \\ -v_5 & v_6 & -v_7 & v_0 \end{bmatrix}$ |
| 14 | $\begin{bmatrix} v_6 \\ -v_6 \end{bmatrix}$ | $\begin{bmatrix} v_7 & v_6 \\ v_7 & -v_6 \end{bmatrix}$ | $\begin{bmatrix} v_6 & v_7 & v_0 \\ -v_6 & v_7 & -v_0 \end{bmatrix}$ | $\begin{bmatrix} v_6 & v_7 & v_0 & v_1 \\ -v_6 & v_7 & -v_0 & v_1 \end{bmatrix}$ |
| 15 | $\begin{bmatrix} v_7 \\ -v_7 \end{bmatrix}$ | $\begin{bmatrix} v_0 & v_7 \\ v_0 & -v_7 \end{bmatrix}$ | $\begin{bmatrix} v_7 & v_0 & v_1 \\ -v_7 & v_0 & -v_1 \end{bmatrix}$ | $\begin{bmatrix} v_7 & v_0 & v_1 & v_2 \\ -v_7 & v_0 & -v_1 & v_2 \end{bmatrix}$ |

Codebook 6 (Resulting from Column-Exchange of the Codebook 3):

| Index | Rank1 codebook | Rank2 codebook | Rank3 codebook | Rank4 codebook |
|---|---|---|---|---|
| 0 | $\begin{bmatrix} v_0 \\ v_0 \end{bmatrix}$ | $\begin{bmatrix} v_0 & v_1 \\ v_0 & -v_1 \end{bmatrix}$ | $\begin{bmatrix} v_0 & v_1 & v_2 \\ v_0 & -v_1 & v_2 \end{bmatrix}$ | $\begin{bmatrix} v_0 & v_1 & v_2 & v_3 \\ v_0 & -v_1 & v_2 & -v_3 \end{bmatrix}$ |
| 1 | $\begin{bmatrix} v_1 \\ v_1 \end{bmatrix}$ | $\begin{bmatrix} v_1 & v_2 \\ v_1 & -v_2 \end{bmatrix}$ | $\begin{bmatrix} v_1 & v_2 & v_3 \\ v_1 & -v_2 & v_3 \end{bmatrix}$ | $\begin{bmatrix} v_1 & v_2 & v_3 & v_4 \\ v_1 & -v_2 & v_3 & -v_4 \end{bmatrix}$ |
| 2 | $\begin{bmatrix} v_2 \\ v_2 \end{bmatrix}$ | $\begin{bmatrix} v_2 & v_3 \\ v_2 & -v_3 \end{bmatrix}$ | $\begin{bmatrix} v_2 & v_3 & v_4 \\ v_2 & -v_3 & v_4 \end{bmatrix}$ | $\begin{bmatrix} v_2 & v_3 & v_4 & v_5 \\ v_2 & -v_3 & v_4 & -v_5 \end{bmatrix}$ |
| 3 | $\begin{bmatrix} v_3 \\ v_3 \end{bmatrix}$ | $\begin{bmatrix} v_3 & v_4 \\ v_3 & -v_4 \end{bmatrix}$ | $\begin{bmatrix} v_3 & v_4 & v_5 \\ v_3 & -v_4 & v_5 \end{bmatrix}$ | $\begin{bmatrix} v_3 & v_4 & v_5 & v_6 \\ v_3 & -v_4 & v_5 & -v_6 \end{bmatrix}$ |
| 4 | $\begin{bmatrix} v_4 \\ v_4 \end{bmatrix}$ | $\begin{bmatrix} v_4 & v_5 \\ v_4 & -v_5 \end{bmatrix}$ | $\begin{bmatrix} v_4 & v_5 & v_6 \\ v_4 & -v_5 & v_6 \end{bmatrix}$ | $\begin{bmatrix} v_4 & v_5 & v_6 & v_7 \\ v_4 & -v_5 & v_6 & -v_7 \end{bmatrix}$ |
| 5 | $\begin{bmatrix} v_5 \\ v_5 \end{bmatrix}$ | $\begin{bmatrix} v_5 & v_6 \\ v_5 & -v_6 \end{bmatrix}$ | $\begin{bmatrix} v_5 & v_6 & v_7 \\ v_5 & -v_6 & v_7 \end{bmatrix}$ | $\begin{bmatrix} v_5 & v_6 & v_7 & v_0 \\ v_5 & -v_6 & v_7 & -v_0 \end{bmatrix}$ |
| 6 | $\begin{bmatrix} v_6 \\ v_6 \end{bmatrix}$ | $\begin{bmatrix} v_6 & v_7 \\ v_6 & -v_7 \end{bmatrix}$ | $\begin{bmatrix} v_6 & v_7 & v_0 \\ v_6 & -v_7 & v_0 \end{bmatrix}$ | $\begin{bmatrix} v_6 & v_7 & v_0 & v_1 \\ v_6 & -v_7 & v_0 & -v_1 \end{bmatrix}$ |
| 7 | $\begin{bmatrix} v_7 \\ v_7 \end{bmatrix}$ | $\begin{bmatrix} v_7 & v_0 \\ v_7 & -v_0 \end{bmatrix}$ | $\begin{bmatrix} v_7 & v_0 & v_1 \\ v_7 & -v_0 & v_1 \end{bmatrix}$ | $\begin{bmatrix} v_7 & v_0 & v_1 & v_2 \\ v_7 & -v_0 & v_1 & -v_2 \end{bmatrix}$ |
| 8 | $\begin{bmatrix} v_0 \\ -v_0 \end{bmatrix}$ | $\begin{bmatrix} v_1 & v_0 \\ v_1 & -v_0 \end{bmatrix}$ | $\begin{bmatrix} v_0 & v_1 & v_2 \\ -v_0 & v_1 & -v_2 \end{bmatrix}$ | $\begin{bmatrix} v_0 & v_1 & v_2 & v_3 \\ -v_0 & v_1 & -v_2 & v_3 \end{bmatrix}$ |
| 9 | $\begin{bmatrix} v_1 \\ -v_1 \end{bmatrix}$ | $\begin{bmatrix} v_2 & v_1 \\ v_2 & -v_1 \end{bmatrix}$ | $\begin{bmatrix} v_1 & v_2 & v_3 \\ -v_1 & v_2 & -v_3 \end{bmatrix}$ | $\begin{bmatrix} v_1 & v_2 & v_3 & v_4 \\ -v_1 & v_2 & -v_3 & v_4 \end{bmatrix}$ |
| 10 | $\begin{bmatrix} v_2 \\ -v_2 \end{bmatrix}$ | $\begin{bmatrix} v_3 & v_2 \\ v_3 & -v_2 \end{bmatrix}$ | $\begin{bmatrix} v_2 & v_3 & v_4 \\ -v_2 & v_3 & -v_4 \end{bmatrix}$ | $\begin{bmatrix} v_2 & v_3 & v_4 & v_5 \\ -v_2 & v_3 & -v_4 & v_5 \end{bmatrix}$ |
| 11 | $\begin{bmatrix} v_3 \\ -v_3 \end{bmatrix}$ | $\begin{bmatrix} v_4 & v_3 \\ v_4 & -v_3 \end{bmatrix}$ | $\begin{bmatrix} v_3 & v_4 & v_5 \\ -v_3 & v_4 & -v_5 \end{bmatrix}$ | $\begin{bmatrix} v_3 & v_4 & v_5 & v_6 \\ -v_3 & v_4 & -v_5 & v_6 \end{bmatrix}$ |
| 12 | $\begin{bmatrix} v_4 \\ -v_4 \end{bmatrix}$ | $\begin{bmatrix} v_5 & v_4 \\ v_5 & -v_4 \end{bmatrix}$ | $\begin{bmatrix} v_4 & v_5 & v_6 \\ -v_4 & v_5 & -v_6 \end{bmatrix}$ | $\begin{bmatrix} v_4 & v_5 & v_6 & v_7 \\ -v_4 & v_5 & -v_6 & v_7 \end{bmatrix}$ |
| 13 | $\begin{bmatrix} v_5 \\ -v_5 \end{bmatrix}$ | $\begin{bmatrix} v_6 & v_5 \\ v_6 & -v_5 \end{bmatrix}$ | $\begin{bmatrix} v_5 & v_6 & v_7 \\ -v_5 & v_6 & -v_7 \end{bmatrix}$ | $\begin{bmatrix} v_5 & v_6 & v_7 & v_0 \\ -v_5 & v_6 & -v_7 & v_0 \end{bmatrix}$ |
| 14 | $\begin{bmatrix} v_6 \\ -v_6 \end{bmatrix}$ | $\begin{bmatrix} v_7 & v_6 \\ v_7 & -v_6 \end{bmatrix}$ | $\begin{bmatrix} v_6 & v_7 & v_0 \\ -v_6 & v_7 & -v_0 \end{bmatrix}$ | $\begin{bmatrix} v_6 & v_7 & v_0 & v_1 \\ -v_6 & v_7 & -v_0 & v_1 \end{bmatrix}$ |
| 15 | $\begin{bmatrix} v_7 \\ -v_7 \end{bmatrix}$ | $\begin{bmatrix} v_0 & v_7 \\ v_0 & -v_7 \end{bmatrix}$ | $\begin{bmatrix} v_7 & v_0 & v_1 \\ -v_7 & v_0 & -v_1 \end{bmatrix}$ | $\begin{bmatrix} v_7 & v_0 & v_1 & v_2 \\ -v_7 & v_0 & -v_1 & v_2 \end{bmatrix}$ |

| Index | Rank1 codebook | Rank2 codebook | Rank3 codebook | Rank4 codebook |
|---|---|---|---|---|
| 16 | $\begin{bmatrix} v_0 \\ jv_0 \end{bmatrix}$ | $\begin{bmatrix} v_0 & v_1 \\ jv_0 & -jv_1 \end{bmatrix}$ | $\begin{bmatrix} v_0 & v_1 & v_2 \\ jv_0 & -jv_1 & jv_2 \end{bmatrix}$ | $\begin{bmatrix} v_0 & v_1 & v_2 & v_3 \\ jv_0 & -jv_1 & jv_2 & -jv_3 \end{bmatrix}$ |
| 17 | $\begin{bmatrix} v_1 \\ jv_1 \end{bmatrix}$ | $\begin{bmatrix} v_1 & v_2 \\ jv_1 & -jv_2 \end{bmatrix}$ | $\begin{bmatrix} v_1 & v_2 & v_3 \\ jv_1 & -jv_2 & jv_3 \end{bmatrix}$ | $\begin{bmatrix} v_1 & v_2 & v_3 & v_4 \\ jv_1 & -jv_2 & jv_3 & -jv_4 \end{bmatrix}$ |
| 18 | $\begin{bmatrix} v_2 \\ jv_2 \end{bmatrix}$ | $\begin{bmatrix} v_2 & v_3 \\ jv_2 & -jv_3 \end{bmatrix}$ | $\begin{bmatrix} v_2 & v_3 & v_4 \\ jv_2 & -jv_3 & jv_4 \end{bmatrix}$ | $\begin{bmatrix} v_2 & v_3 & v_4 & v_5 \\ jv_2 & -jv_3 & jv_4 & -jv_5 \end{bmatrix}$ |
| 19 | $\begin{bmatrix} v_3 \\ jv_3 \end{bmatrix}$ | $\begin{bmatrix} v_3 & v_4 \\ jv_3 & -jv_4 \end{bmatrix}$ | $\begin{bmatrix} v_3 & v_4 & v_5 \\ jv_3 & -jv_4 & jv_5 \end{bmatrix}$ | $\begin{bmatrix} v_3 & v_4 & v_5 & v_6 \\ jv_3 & -jv_4 & jv_5 & -jv_6 \end{bmatrix}$ |
| 20 | $\begin{bmatrix} v_4 \\ jv_4 \end{bmatrix}$ | $\begin{bmatrix} v_4 & v_5 \\ jv_4 & -jv_5 \end{bmatrix}$ | $\begin{bmatrix} v_4 & v_5 & v_6 \\ jv_4 & -jv_5 & jv_6 \end{bmatrix}$ | $\begin{bmatrix} v_4 & v_5 & v_6 & v_7 \\ jv_4 & -jv_5 & jv_6 & -jv_7 \end{bmatrix}$ |
| 21 | $\begin{bmatrix} v_5 \\ jv_5 \end{bmatrix}$ | $\begin{bmatrix} v_5 & v_6 \\ jv_5 & -jv_6 \end{bmatrix}$ | $\begin{bmatrix} v_5 & v_6 & v_7 \\ jv_5 & -jv_6 & jv_7 \end{bmatrix}$ | $\begin{bmatrix} v_5 & v_6 & v_7 & v_0 \\ jv_5 & -jv_6 & jv_7 & -jv_0 \end{bmatrix}$ |
| 22 | $\begin{bmatrix} v_6 \\ jv_6 \end{bmatrix}$ | $\begin{bmatrix} v_6 & v_7 \\ jv_6 & -jv_7 \end{bmatrix}$ | $\begin{bmatrix} v_6 & v_7 & v_0 \\ jv_6 & -jv_7 & jv_0 \end{bmatrix}$ | $\begin{bmatrix} v_6 & v_7 & v_0 & v_1 \\ jv_6 & -jv_7 & jv_0 & -jv_1 \end{bmatrix}$ |
| 23 | $\begin{bmatrix} v_7 \\ jv_7 \end{bmatrix}$ | $\begin{bmatrix} v_7 & v_0 \\ jv_7 & -jv_0 \end{bmatrix}$ | $\begin{bmatrix} v_7 & v_0 & v_1 \\ jv_7 & -jv_0 & jv_1 \end{bmatrix}$ | $\begin{bmatrix} v_7 & v_0 & v_1 & v_2 \\ jv_7 & -jv_0 & jv_1 & -jv_2 \end{bmatrix}$ |
| 24 | $\begin{bmatrix} v_0 \\ -jv_0 \end{bmatrix}$ | $\begin{bmatrix} v_1 & v_0 \\ jv_1 & -jv_0 \end{bmatrix}$ | $\begin{bmatrix} v_0 & v_1 & v_2 \\ -jv_0 & jv_1 & -jv_2 \end{bmatrix}$ | $\begin{bmatrix} v_0 & v_1 & v_2 & v_3 \\ -jv_0 & jv_1 & -jv_2 & jv_3 \end{bmatrix}$ |
| 25 | $\begin{bmatrix} v_1 \\ -jv_1 \end{bmatrix}$ | $\begin{bmatrix} v_2 & v_1 \\ jv_2 & -jv_1 \end{bmatrix}$ | $\begin{bmatrix} v_1 & v_2 & v_3 \\ -jv_1 & jv_2 & -jv_3 \end{bmatrix}$ | $\begin{bmatrix} v_1 & v_2 & v_3 & v_4 \\ -jv_1 & jv_2 & -jv_3 & jv_4 \end{bmatrix}$ |
| 26 | $\begin{bmatrix} v_2 \\ -jv_2 \end{bmatrix}$ | $\begin{bmatrix} v_3 & v_2 \\ jv_3 & -jv_2 \end{bmatrix}$ | $\begin{bmatrix} v_2 & v_3 & v_4 \\ -jv_2 & jv_3 & -jv_4 \end{bmatrix}$ | $\begin{bmatrix} v_2 & v_3 & v_4 & v_5 \\ -jv_2 & jv_3 & -jv_4 & jv_5 \end{bmatrix}$ |
| 27 | $\begin{bmatrix} v_3 \\ -jv_3 \end{bmatrix}$ | $\begin{bmatrix} v_4 & v_3 \\ jv_4 & -jv_3 \end{bmatrix}$ | $\begin{bmatrix} v_3 & v_4 & v_5 \\ -jv_3 & jv_4 & -jv_5 \end{bmatrix}$ | $\begin{bmatrix} v_3 & v_4 & v_5 & v_6 \\ -jv_3 & jv_4 & -jv_5 & jv_6 \end{bmatrix}$ |
| 28 | $\begin{bmatrix} v_4 \\ -jv_4 \end{bmatrix}$ | $\begin{bmatrix} v_5 & v_4 \\ jv_5 & -jv_4 \end{bmatrix}$ | $\begin{bmatrix} v_4 & v_5 & v_6 \\ -jv_4 & jv_5 & -jv_6 \end{bmatrix}$ | $\begin{bmatrix} v_4 & v_5 & v_6 & v_7 \\ -jv_4 & jv_5 & -jv_6 & jv_7 \end{bmatrix}$ |
| 29 | $\begin{bmatrix} v_5 \\ -jv_5 \end{bmatrix}$ | $\begin{bmatrix} v_6 & v_5 \\ jv_6 & -jv_5 \end{bmatrix}$ | $\begin{bmatrix} v_5 & v_6 & v_7 \\ -jv_5 & jv_6 & -jv_7 \end{bmatrix}$ | $\begin{bmatrix} v_5 & v_6 & v_7 & v_0 \\ -jv_5 & jv_6 & -jv_7 & jv_0 \end{bmatrix}$ |
| 30 | $\begin{bmatrix} v_6 \\ -jv_6 \end{bmatrix}$ | $\begin{bmatrix} v_7 & v_6 \\ jv_7 & -jv_6 \end{bmatrix}$ | $\begin{bmatrix} v_6 & v_7 & v_0 \\ -jv_6 & jv_7 & -jv_0 \end{bmatrix}$ | $\begin{bmatrix} v_6 & v_7 & v_0 & v_1 \\ -jv_6 & jv_7 & -jv_0 & jv_1 \end{bmatrix}$ |
| 31 | $\begin{bmatrix} v_7 \\ -jv_7 \end{bmatrix}$ | $\begin{bmatrix} v_0 & v_7 \\ jv_0 & -jv_7 \end{bmatrix}$ | $\begin{bmatrix} v_7 & v_0 & v_1 \\ -jv_7 & jv_0 & -jv_1 \end{bmatrix}$ | $\begin{bmatrix} v_7 & v_0 & v_1 & v_2 \\ -jv_7 & jv_0 & -jv_1 & jv_2 \end{bmatrix}$ |

Figure 2:
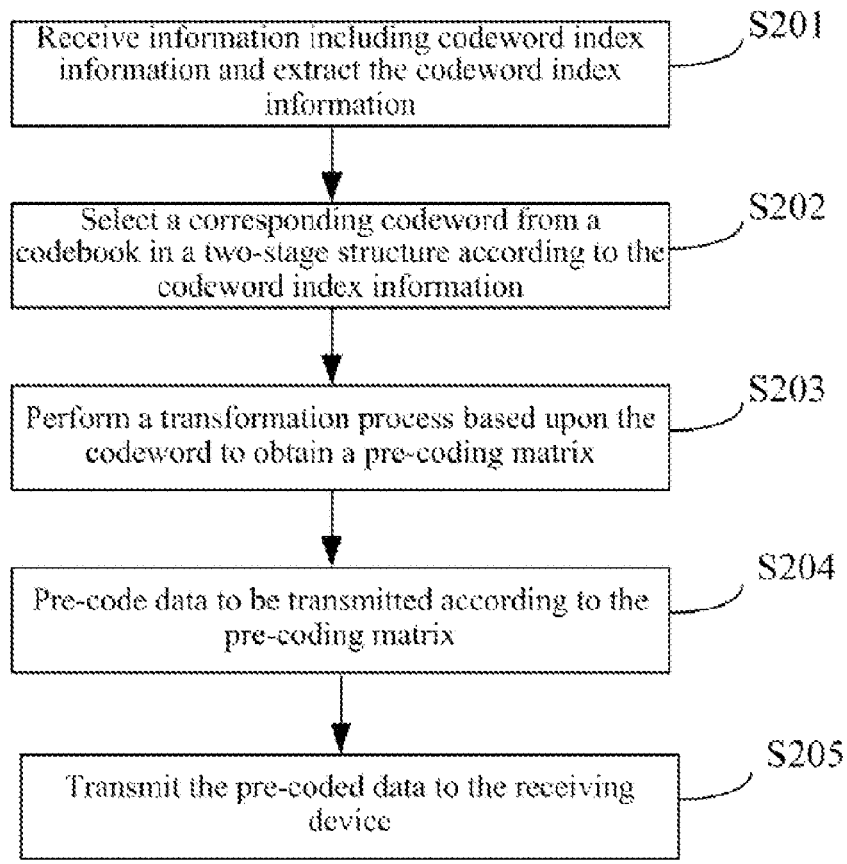
FIG. 2 is a flow chart of a method for transmitting information in a closed-loop multi-antenna system according to an embodiment of the invention.

As illustrated in FIG. 2, which is a flow chart of a method for transmitting information in a multi-antenna system according to an embodiment of the invention, the method includes the following steps.

S201: A transmitting device receives information including codeword index information transmitted from a receiving device and extracts the codeword index information therefrom. Specifically, in order to know the channel condition, the transmitting device receives a Channel Quality Indicator (CQI), a selected Rank, a selected codeword and other information fed back from a remote receiver. Such information of the CQI, the selected Rank and the selected codeword will be used in a subsequent transmission process.

In the embodiment of the invention, a codeword $c_n^r$ codebook satisfies the following relationship:

$$c_n^r = [\Phi_k^r(:,1) \otimes w_m^r(:,1) \; \Phi_k^r(:,2) \otimes w_m^r(:,2) \ldots \Phi_k^r(:,r) \otimes w_m^r(:,r)],$$

where $\Phi_k^r$ is a $2 \times r$-dimension matrix, $k=0, 1, \ldots, K_r-1$, $w_m^r$ is a $N_T/2 \times r$-dimension matrix, $m=0, 1, \ldots, M_r-1$, $X(:,l)$ represents the $l^{th}$ column of a matrix X, and $\otimes$ represents a direct product of matrices; and a set consists of a number $K_r$ of $\Phi_k^r$ is a transformation codebook of the codebook in the two-stage structure, and set consists of a number $M_r$ of $w_m^r$ is a basic codebook of the codebook in the two-stage structure. Therefore, the fed-back codeword index information can be the codeword index n in the codebook, the codeword indexes k and m in the transformation codebook and the basic codebook, or another combination of k and m. In the codebook 3, for example, if the fed-back codeword index information is $n \in \{0, \ldots, 31\}$, a corresponding codeword can be retrieved directly from the codebook; and if the fed-back codeword index information is $k \in \{0, \ldots, 3\}$ and $m \in \{0, \ldots, 7\}$, a corresponding codeword can also be retrieved from the codebook; and also since the codeword in this codebook satisfies the following characteristic:

$$c_n^r = \begin{bmatrix} c_l^r(1:N_T/2, :) \\ f(l)c_l^r(N_T/2+1:N_T, :) \end{bmatrix}, \text{ where } f(l) = \begin{cases} 1 & l \leq 7 \\ j & l > 7 \end{cases} \text{ and}$$

$$c_l^r = [\Phi_k^r(:,1) \otimes w_m^r(:,1) \quad \Phi_k^r(:,2) \otimes w_m^r(:,2) \quad \ldots \quad \Phi_k^r(:,r) \otimes w_m^r(:,r)]$$

where $X(l_1, l_2, :)$ represents a matrix consists of the $l_1^{th}$ to $l_2^{th}$ row vectors in the matrix X, therefore, if the fed-back codeword index information is $l \in \{0, \ldots, 15\}$ and $f(l)$, a corresponding codeword can also be retrieved from the codebook.

S202: The transmitting device selects a corresponding codeword from a codebook in a two-stage structure according to the codeword index information, and all of the foregoing codebooks 1 to 5 can be applied in this embodiment.

S203: The transmitting device performs a transformation process (e.g., a zero-forcing process, etc.) based upon the codeword to obtain a pre-coding matrix. Of course, the corresponding codeword can alternatively be taken directly as a pre-coding matrix in another embodiment.

S204: The transmitting device pre-codes data to be transmitted according to the pre-coding matrix.

S205: The transmitting device transmits the pre-coded data to the receiving device.

Figure 3:
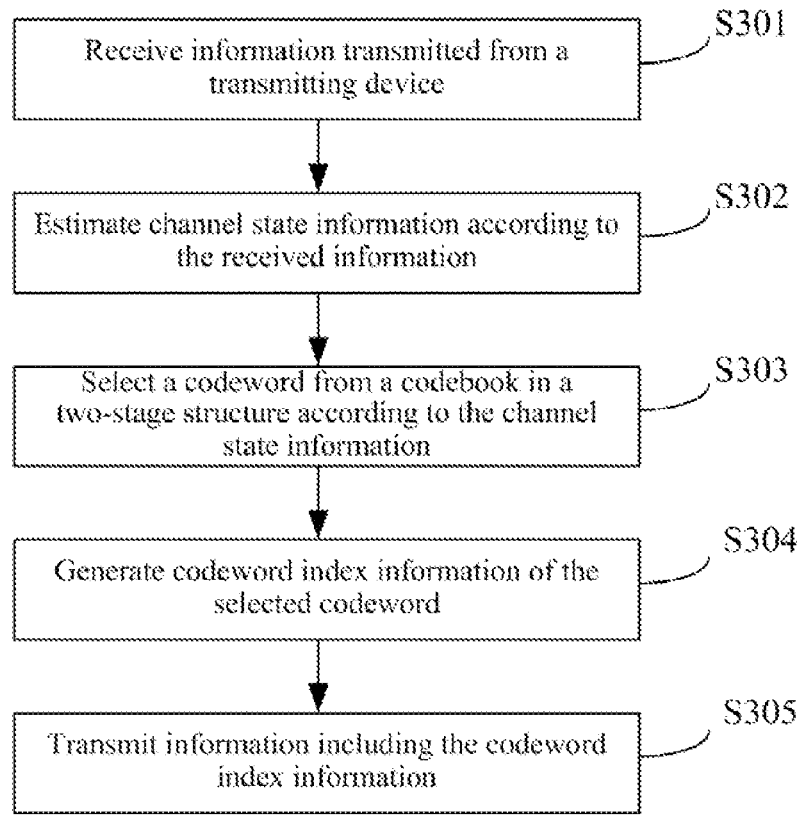
FIG. 3 is a flow chart of a method for receiving information in a closed-loop multi-antenna system according to an embodiment of the invention.

As illustrated in FIG. 3, which is a flow chart of a method for receiving information in a multi-antenna system according to an embodiment of the invention, the method includes the following steps.

S301: A receiving device receives information transmitted from a transmitting device.

S302: The receiving device estimates channel state information according to the received information.

S303: The receiving device selects a corresponding codeword from a codebook in a two-stage structure according to the channel state information, and all of the foregoing codebooks 1 to 5 can be applied in this embodiment.

S304: The receiving device generates codeword index information of the selected codeword. Like the foregoing embodiment, since the codeword satisfies the following relationship:

$$c_l^r = [\Phi_k^r(:,1) \otimes w_m^r(:,1) \quad \Phi_k^r(:,2) \otimes w_m^r(:,2) \ldots \Phi_k^r(:,r) \otimes w_m^r(:,r)],$$

where $\Phi_k^r$ is a 2×r-dimension matrix, k=0, 1, ..., $K_r$-1, $w_m^r$ is a $N_T/2$×r-dimension matrix, m=0, 1, ..., $M_r$-1, X(:,l) represents the $l^{th}$ column of a matrix X, and $\otimes$ represents a direct product of matrices; and a set consists of a number $K_r$ of $\Phi_k^r$ is a transformation codebook of the codebook in the two-stage structure, and set consists of a number $M_r$ of $w_m^r$ is a basic codebook of the codebook in the two-stage structure, therefore the generated codeword index information can be the codeword index n in the codebook, the codeword indexes k and m in the transformation codebook and the basic codebook, or another combination of k and m. In the codebook 3, for example, the fed-back codeword index information can be $n \in \{0, \ldots, 31\}$; or the fed-back codeword index information can be $k \in \{0, \ldots, 3\}$ and $m \in \{0, \ldots, 7\}$, and a transmitting device can retrieve a corresponding codeword from the codebook according to either the codeword index n or the combination of the codeword indexes k and m; and also since the codeword in this codebook satisfies the following characteristic:

$$c_n^r = \begin{bmatrix} c_l^r(1:N_T/2, :) \\ f(l)c_l^r(N_T/2+1:N_T, :) \end{bmatrix}, \text{ where } f(l) = \begin{cases} 1 & l \leq 7 \\ j & l > 7 \end{cases} \text{ and,}$$

$$c_l^r = [\Phi_k^r(:,1) \otimes w_m^r(:,1) \quad \Phi_k^r(:,2) \otimes w_m^r(:,2) \ldots \Phi_k^r(:,r) \otimes w_m^r(:,r)]$$

where $X(l_1:l_2,:)$ represents a matrix consists of the $l_1^{th}$ to $l_2^{th}$ row vectors in the matrix X, therefore if the fed-back codeword index information is $l \in \{0, \ldots, 15\}$ and $f(l)$, the transmitting device can also retrieve a corresponding codeword from the codebook.

S305: The receiving device transmits information including the codeword index information to the transmitting device.

Figure 4:
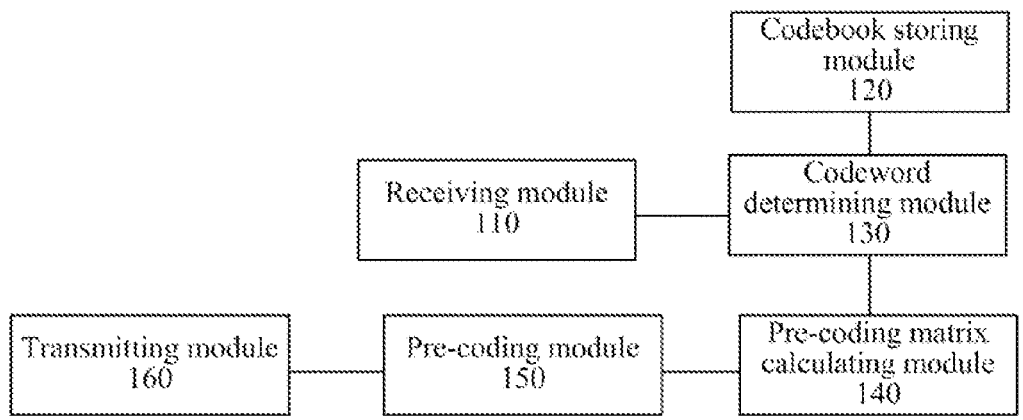
FIG. 4 is a schematic structural diagram of a transmitting device according to an embodiment of the invention.

Reference is made to FIG. 4 illustrating a schematic structural diagram of a transmitting device according to an embodiment of the invention, which includes a receiving module 110, a codebook storing module 120, a codeword determining module 130, a pre-coding matrix calculating module 140, a pre-coding module 150 and a transmitting module 160. The receiving module 110 is configured to receive information including codeword index information transmitted from a receiving device. The codebook storing module 120 is configured to store a codebook in a two-stage structure. The codeword determining module 130 is configured to select a corresponding codeword from the codebook in the two-stage structure stored in the codebook storing module 120 according to the codeword index information. The pre-coding matrix calculating module 140 is configured to generate a pre-coding matrix according to the selected codeword, for example, perform a transformation process (e.g., zero-forcing process, etc.) based upon the codeword to obtain a pre-coding matrix or take the corresponding codeword directly as a pre-coding matrix. The pre-coding module 150 is configured to pre-code data to be transmitted according to the pre-coding matrix. The transmitting module 160 is configured to transmit the pre-coded data to the receiving device.

Figure 5:
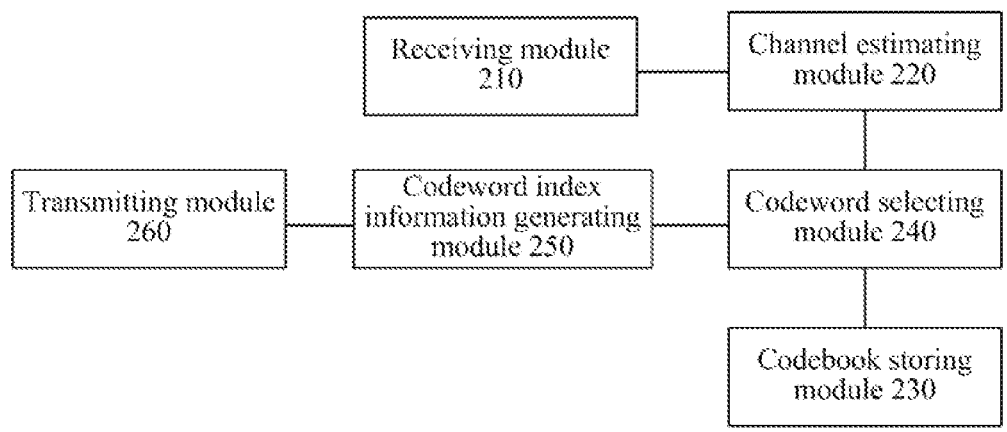
FIG. 5 is a schematic structural diagram of a receiving device according to an embodiment of the invention.

Reference is made to FIG. 5 illustrating a schematic structural diagram of a receiving device according to an embodiment of the invention, which includes a receiving module 210, a channel estimating module 220, a codebook storing module 230, a codeword selecting module 240, a codeword index information generating module 250 and a transmitting module 260. The receiving module 210 is configured to receive information transmitted from a transmitting device. The channel estimating module 220 is configured to estimate channel state information according to the information received by the receiving module 210. The codebook storing module 230 is configured to store a codebook in a two-stage structure. The codeword selecting module 240 is configured to select a corresponding codeword from the codebook in the two-stage structure according to the e channel state information. The codeword index information generating module 250 is configured to generate codeword index information of the selected codeword. The transmitting module 260 is configured to transmit information including the codeword index information to the transmitting device.

In the foregoing solutions proposed according to the embodiments of the invention, a formed and used codebook matches as closely as possibly a channel distribution characteristic of a dually polarized antenna to minimize a performance loss due to quantization of the codebook, thereby improving effectively the performance of a pre-coding system. Furthermore, the codebook proposed by the invention has a two-stage structure and can support both a feedback of one PMI and a feedback of two PMIs.

Those ordinarily skilled in the art can appreciate that all or a part of the steps in the methods according to the foregoing embodiments of the invention can be perfumed in program instructing relevant hardware, which may be stored in a computer readable storage medium and which upon execution can perform one or combination of the steps in the methods according to the embodiments.

Furthermore, the respective functional elements in the respective embodiments of the invention can be integrated in a processing module or can physically exist separately or two or inure of the elements can be integrated in a module. The integrated module can be embodied in the form of hardware or in the form of a software functional module. If the integrated module is embodied in the form of a software functional module and sold or used as a separate product, it can be stored in a computer readable storage medium.

The storage medium mentioned above can be a read only memory, a magnetic disk, an optical disk, etc.

The foregoing description is merely illustrative of the preferred embodiments of the invention, and it shall be pointed out that those ordinarily skilled in the art can further make several adaptations and modifications without departing from the principle of the invention and these adaptations and modifications shall also be construed as coming into the scope of the invention.

The invention claimed is:

1. A method for transmitting information in a closed-loop multi-antenna system, comprising:

receiving, by a transmitting device, information comprising codeword index information transmitted from a receiving device;

selecting, by the transmitting device, a corresponding codeword from a codebook in a two-stage structure according to the codeword index information;

generating, by the transmitting device, a pre-coding matrix from the selected codeword;

pre-coding, by the transmitting device, data to be transmitted according to the pre-coding matrix; and transmitting, by the transmitting device, the pre-coded data to the receiving device;

wherein a codeword $c_n^r$ in the codebook in the two-stage structure satisfies the following relationship:

$$c_n^r = \begin{matrix}[\Phi_k^r(:,1) \otimes w_m^r(:,1) & \Phi_k^r(:,2) \otimes w_m^r(:,2) & \ldots \\ & \Phi_k^r(:,r) \otimes w_m^r(:,r)]\end{matrix}$$

$$= \begin{bmatrix} \Phi_k^r(1,1)w_m^r(:,1) & \Phi_k^r(1,2)w_m^r(:,2) & \ldots & \Phi_k^r(1,r)w_m^r(:,r) \\ \Phi_k^r(2,1)w_m^r(:,1) & \Phi_k^r(2,2)w_m^r(:,2) & \ldots & \Phi_k^r(2,r)w_m^r(:,r) \end{bmatrix},$$

wherein $\Phi_k^r$ is a 2×r-dimension matrix, k=0, 1, ..., K−1, $w_m^r$ is a $N_T/2$×r-dimension matrix, m=0, 1, ..., $M_r$−1, r is the number of Ranks, $N_T$ is the number of transmitting antennas, X(:,l) represents the $l^{th}$ column of a matrix X, $X(l_1,l_2)$ represents an element in the $l_1^{th}$ row and in the $l_2^{th}$ column of the matrix X, and ⊗ represents a direct product of matrices; and a set consists of a number $K_r$ of $\Phi_k^r$ is a transformation codebook of the codebook in the two-stage structure, and a set consists of a number $M_r$ of $w_m^r$ is a basic codebook of the codebook in the two-stage structure.

2. The method for transmitting information in a closed-loop multi-antenna system according to claim 1, wherein a column vector of the matrix $w_m^r$ is a truncated $2^K$-DFT vector, and wherein $2^K \geq N_T/2$ and K is a natural number; and if $c_n^r$ is a codeword with a unitary characteristic, column vectors of the codeword $w_m^r$ of the basic codebook, corresponding to mutually non-orthogonal columns of the codeword $\Phi_k^r$ in the transformation codebook, are mutually orthogonal.

3. The method for transmitting information in a closed-loop multi-antenna system according to claim 2, wherein with $N_T=8$, the matrix $\Phi_k^r$ takes its values selected from all or a part of matrices in Table 1 below or first r columns in all or a part of matrices in Table 2 below, and the matrix $w_m^r$ takes its values selected from all or a part of matrices in Table 3 below or first r columns in all or a part of matrices in Table 4 below:

Table 1 is:

| Index k | Rank3 transformation codebook $\Phi_k^3$ | Rank4 transformation codebook $\Phi_k^4$ |
| --- | --- | --- |
| 0 | $\begin{bmatrix} 1 & 1 & 1 \\ 1 & 1 & -1 \end{bmatrix}$ | $\begin{bmatrix} 1 & 1 & 1 & 1 \\ 1 & -1 & 1 & -1 \end{bmatrix}$ |
| 1 | $\begin{bmatrix} 1 & \sqrt{2} & 0 \\ 1 & 0 & \sqrt{2} \end{bmatrix}$ | $\begin{bmatrix} 1 & 0 & 1 & 0 \\ 0 & 1 & 0 & 1 \end{bmatrix}$, |

Table 2 is:

| Index | $\Phi_k$ |
| --- | --- |
| 0 | $\Phi_0 = \begin{bmatrix} 1 & 1 & 1 & 1 \\ 1 & -1 & 1 & -1 \end{bmatrix}$ |
| 1 | $\Phi_1 = \begin{bmatrix} 1 & 1 & 1 & 1 \\ -1 & 1 & -1 & 1 \end{bmatrix}$ |
| 2 | $\Phi_2 = \begin{bmatrix} 1 & 1 & 1 & 1 \\ j & -j & j & -j \end{bmatrix}$ |
| 3 | $\Phi_3 = \begin{bmatrix} 1 & 1 & 1 & 1 \\ -j & j & -j & j \end{bmatrix}$ |

-continued

| Index | $\Phi_k$ |
|---|---|
| 4 | $\Phi_4 = \begin{bmatrix} 1 & 1 & 1 & 1 \\ \frac{1+j}{\sqrt{2}} & -\frac{1+j}{\sqrt{2}} & \frac{1+j}{\sqrt{2}} & -\frac{1+j}{\sqrt{2}} \end{bmatrix}$ |
| 5 | $\Phi_5 = \begin{bmatrix} 1 & 1 & 1 & 1 \\ -\frac{1+j}{\sqrt{2}} & \frac{1+j}{\sqrt{2}} & -\frac{1+j}{\sqrt{2}} & \frac{1+j}{\sqrt{2}} \end{bmatrix}$ |
| 6 | $\Phi_6 = \begin{bmatrix} 1 & 1 & 1 & 1 \\ \frac{-1+j}{\sqrt{2}} & \frac{1-j}{\sqrt{2}} & \frac{-1+j}{\sqrt{2}} & \frac{1-j}{\sqrt{2}} \end{bmatrix}$ |
| 7 | $\Phi_7 = \begin{bmatrix} 1 & 1 & 1 & 1 \\ \frac{1-j}{\sqrt{2}} & \frac{-1+j}{\sqrt{2}} & \frac{1-j}{\sqrt{2}} & \frac{-1+j}{\sqrt{2}} \end{bmatrix}$, |

Table 3 is:

| Index | Rank3 basic codebook $w_m^3$ | Rank4 basic codebook $w_m^4$ |
|---|---|---|
| 0 | [$v_0$ $v_6$ $v_6$] | [$v_0$ $v_0$ $v_6$ $v_6$] |
| 1 | [$v_1$ $v_7$ $v_7$] | [$v_1$ $v_1$ $v_7$ $v_7$] |
| 2 | [$v_2$ $v_0$ $v_0$] | [$v_2$ $v_2$ $v_0$ $v_0$] |
| 3 | [$v_3$ $v_1$ $v_1$] | [$v_3$ $v_3$ $v_1$ $v_1$] |
| 4 | [$v_4$ $v_2$ $v_2$] | [$v_4$ $v_4$ $v_2$ $v_2$] |
| 5 | [$v_5$ $v_3$ $v_3$] | [$v_5$ $v_5$ $v_3$ $v_3$] |
| 6 | [$v_6$ $v_4$ $v_4$] | [$v_6$ $v_6$ $v_4$ $v_4$] |
| 7 | [$v_7$ $v_5$ $v_5$] | [$v_7$ $v_7$ $v_5$ $v_5$], | and Table 4 is:

| Index | $w_m$ |
|---|---|
| 0 | $w_0 = [v_0\ v_1\ v_2\ v_3]$ |
| 1 | $w_1 = [v_1\ v_2\ v_3\ v_4]$ |
| 2 | $w_2 = [v_2\ v_3\ v_4\ v_5]$ |
| 3 | $w_3 = [v_3\ v_4\ v_5\ v_6]$ |
| 4 | $w_4 = [v_4\ v_5\ v_6\ v_7]$ |
| 5 | $w_5 = [v_5\ v_6\ v_7\ v_0]$ |
| 6 | $w_6 = [v_6\ v_7\ v_0\ v_1]$ |
| 7 | $w_7 = [v_7\ v_0\ v_1\ v_2]$, | wherein:

| Index | $v_n$ |
|---|---|
| 0 | $v_0 = [1\ 1\ 1\ 1]^T$ |
| 1 | $v_1 = [1\ (1-j)/\sqrt{2}\ -j\ (-1-j)/\sqrt{2}]^T$ |
| 2 | $v_2 = [1\ -j\ -1\ j]^T$ |
| 3 | $v_3 = [1\ (-1-j)/\sqrt{2}\ j\ (1-j)/\sqrt{2}]^T$ |
| 4 | $v_4 = [1\ -1\ 1\ -1]^T$ |
| 5 | $v_5 = [1\ (-1+j)/\sqrt{2}\ -j\ (1+j)/\sqrt{2}]^T$ |
| 6 | $v_6 = [1\ j\ -1\ -j]^T$ |
| 7 | $v_7 = [1\ (1+j)/\sqrt{2}\ j\ (-1+j)/\sqrt{2}]^T$. |

4. The method for transmitting information in a closed-loop multi-antenna system according to claim 1, wherein the codebook in the two-stage structure comprises a codebook resulting from column exchange.

5. A method for receiving information in a closed-loop multi-antenna system, comprising:
receiving, by a receiving device, information transmitted from a transmitting device;
estimating, by the receiving device, channel state information according to the information;
selecting, by the receiving device, a corresponding codeword from a codebook in a two-stage structure according to the channel state information;
generating, by the receiving device, codeword index information of the selected codeword; and
transmitting, by the receiving device, the codeword index information of the codeword to the transmitting device;
wherein a codeword $c_n^r$ in the codebook in the two-stage structure satisfies the following relationship:

$$c_n^r = [\Phi_k^r(:,1) \otimes w_m^r(:,1)\ \ \Phi_k^r(:,2) \otimes w_m^r(:,2)\ \ \ldots\ \ \Phi_k^r(:,r) \otimes w_m^r(:,r)],$$

$$= \begin{bmatrix} \Phi_k^r(1,1)w_m^r(:,1) & \Phi_k^r(1,2)w_m^r(:,2) & \ldots & \Phi_k^r(1,r)w_m^r(:,r) \\ \Phi_k^r(2,1)w_m^r(:,1) & \Phi_k^r(2,2)w_m^r(:,2) & \ldots & \Phi_k^r(2,r)w_m^r(:,r) \end{bmatrix}$$

wherein $\Phi_k^r$ is a 2×r-dimension matrix, k=0, 1, ..., K−1, $w_m^r$ is a $N_T/2$×r-dimension matrix, m=0, 1, ..., $M_r$−1, r is the number of Ranks, $N_T$ is the number of transmitting antennas, X(:,l) represents the $l^{th}$ column of a matrix X, X($l_1,l_2$) represents an element in the $l_1^{th}$ row and in the $l_2^{th}$ column of the matrix X, and $\otimes$ represents a direct product of matrices, and a set consists of a number $K_r$ of $\Phi_k^r$ is a transformation codebook of the codebook in the two-stage structure, and a set consists of a number $M_r$ of $w_m^r$ is a basic codebook of the codebook in the two-stage structure.

6. The method for receiving information in a closed-loop multi-antenna system according to claim 5, wherein a column vector of the matrix $w_m^r$ is a truncated $2^K$-DFT vector, and wherein $2^K \geq N_T/2$ and K is a natural number; and if $c_n^r$ is a codeword with a unitary characteristic, column vectors of the codeword $w_m^r$ of the basic codebook, corresponding to mutually non-orthogonal columns of the codeword $\Phi_k^r$ in the transformation codebook, are mutually orthogonal.

7. The method for receiving information in a closed-loop multi-antenna system according to claim 6, wherein with $N_T$=8, the matrix $\Phi_k^r$ takes its values selected from all or a part of matrices in Table 1 below or first r columns in all or a part of matrices in Table 2 below, and the matrix $w_m^r$ takes its values selected from all or a part of matrices in Table 3 below or first r columns in all or a part of matrices in Table 4 below:

Table 1 is:

| Index k | Rank3 transformation codebook $\Phi_k^3$ | Rank4 transformation codebook $\Phi_k^4$ |
|---|---|---|
| 0 | $\begin{bmatrix} 1 & 1 & 1 \\ 1 & 1 & -1 \end{bmatrix}$ | $\begin{bmatrix} 1 & 1 & 1 & 1 \\ 1 & -1 & 1 & -1 \end{bmatrix}$ |
| 1 | $\begin{bmatrix} 1 & \sqrt{2} & 0 \\ 1 & 0 & \sqrt{2} \end{bmatrix}$ | $\begin{bmatrix} 1 & 0 & 1 & 0 \\ 0 & 1 & 0 & 1 \end{bmatrix}$, |

Table 2 is:

| Index | $\Phi_k$ |
|---|---|
| 0 | $\Phi_0 = \begin{bmatrix} 1 & 1 & 1 & 1 \\ 1 & -1 & 1 & -1 \end{bmatrix}$ |

-continued

| Index | $\Phi_k$ |
|---|---|
| 1 | $\Phi_1 = \begin{bmatrix} 1 & 1 & 1 & 1 \\ -1 & 1 & -1 & 1 \end{bmatrix}$ |
| 2 | $\Phi_2 = \begin{bmatrix} 1 & 1 & 1 & 1 \\ j & -j & j & -j \end{bmatrix}$ |
| 3 | $\Phi_3 = \begin{bmatrix} 1 & 1 & 1 & 1 \\ -j & j & -j & j \end{bmatrix}$ |
| 4 | $\Phi_4 = \begin{bmatrix} 1 & 1 & 1 & 1 \\ \frac{1+j}{\sqrt{2}} & -\frac{1+j}{\sqrt{2}} & \frac{1+j}{\sqrt{2}} & -\frac{1+j}{\sqrt{2}} \end{bmatrix}$ |
| 5 | $\Phi_5 = \begin{bmatrix} 1 & 1 & 1 & 1 \\ -\frac{1+j}{\sqrt{2}} & \frac{1+j}{\sqrt{2}} & -\frac{1+j}{\sqrt{2}} & \frac{1+j}{\sqrt{2}} \end{bmatrix}$ |
| 6 | $\Phi_6 = \begin{bmatrix} 1 & 1 & 1 & 1 \\ \frac{-1+j}{\sqrt{2}} & \frac{1-j}{\sqrt{2}} & \frac{-1+j}{\sqrt{2}} & \frac{1-j}{\sqrt{2}} \end{bmatrix}$ |
| 7 | $\Phi_7 = \begin{bmatrix} 1 & 1 & 1 & 1 \\ \frac{1-j}{\sqrt{2}} & \frac{-1+j}{\sqrt{2}} & \frac{1-j}{\sqrt{2}} & \frac{-1+j}{\sqrt{2}} \end{bmatrix}$ |

Table 3 is:

| Index | Rank3 basic codebook $w_m^3$ | Rank4 basic codebook $w_m^4$ |
|---|---|---|
| 0 | [$v_0$ $v_6$ $v_6$] | [$v_0$ $v_0$ $v_6$ $v_6$] |
| 1 | [$v_1$ $v_7$ $v_7$] | [$v_1$ $v_1$ $v_7$ $v_7$] |
| 2 | [$v_2$ $v_0$ $v_0$] | [$v_2$ $v_2$ $v_0$ $v_0$] |
| 3 | [$v_3$ $v_1$ $v_1$] | [$v_3$ $v_3$ $v_1$ $v_1$] |
| 4 | [$v_4$ $v_2$ $v_2$] | [$v_4$ $v_4$ $v_2$ $v_2$] |
| 5 | [$v_5$ $v_3$ $v_3$] | [$v_5$ $v_5$ $v_3$ $v_3$] |
| 6 | [$v_6$ $v_4$ $v_4$] | [$v_6$ $v_6$ $v_4$ $v_4$] |
| 7 | [$v_7$ $v_5$ $v_5$] | [$v_7$ $v_7$ $v_5$ $v_5$], | and Table 4 is:

| Index | $w_m$ |
|---|---|
| 0 | $w_0 = [v_0\ v_1\ v_2\ v_3]$ |
| 1 | $w_1 = [v_1\ v_2\ v_3\ v_4]$ |
| 2 | $w_2 = [v_2\ v_3\ v_4\ v_5]$ |
| 3 | $w_3 = [v_3\ v_4\ v_5\ v_6]$ |
| 4 | $w_4 = [v_4\ v_5\ v_6\ v_7]$ |
| 5 | $w_5 = [v_5\ v_6\ v_7\ v_0]$ |
| 6 | $w_6 = [v_6\ v_7\ v_0\ v_1]$ |
| 7 | $w_7 = [v_7\ v_0\ v_1\ v_2]$, | wherein:

| Index | $v_n$ |
|---|---|
| 0 | $v_0 = [1\ 1\ 1\ 1]^T$ |
| 1 | $v_1 = [1\ (1-j)/\sqrt{2}\ -j\ (-1-j)/\sqrt{2}]^T$ |
| 2 | $v_2 = [1\ -j\ -1\ j]^T$ |
| 3 | $v_3 = [1\ (-1-j)/\sqrt{2}\ j\ (1-j)/\sqrt{2}]^T$ |
| 4 | $v_4 = [1\ -1\ 1\ -1]^T$ |
| 5 | $v_5 = [1\ (-1+j)/\sqrt{2}\ -j\ (1+j)/\sqrt{2}]^T$ |
| 6 | $v_6 = [1\ j\ -1\ -j]^T$ |
| 7 | $v_7 = [1\ (1+j)/\sqrt{2}\ j\ (-1+j)/\sqrt{2}]^T$. |

8. The method for receiving information in a closed-loop multi-antenna system according to claim 5, wherein the codebook in the two-stage structure comprises a codebook resulting from column exchange.

9. A transmitting device, comprising a receiving module, a codeword determining module, a pre-coding matrix calculating module, a pre-coding module and a transmitting module, wherein:
the receiving module is configured to receive information comprising codeword index information transmitted from a receiving device;
the codeword determining module is configured to select a corresponding codeword from a codebook in a two-stage structure according to the codeword index information;
the pre-coding matrix calculating module is configured to generate a pre-coding matrix according to the selected codeword;
the pre-coding module is configured to pre-code data to be transmitted according to the pre-coding matrix; and
the transmitting module is configured to transmit the pre-coded data to the receiving device;
wherein a codeword $c_n^r$ in the codebook in the two-stage structure satisfies the following relationship:

$$c_n^r = [\Phi_k^r(:,1) \otimes w_m^r(:,1) \quad \Phi_k^r(:,2) \otimes w_m^r(:,2) \quad \ldots \quad \Phi_k^r(:,r) \otimes w_m^r(:,r)]$$
$$= \begin{bmatrix} \Phi_k^r(1,1)w_m^r(:,1) & \Phi_k^r(1,2)w_m^r(:,2) & \ldots & \Phi_k^r(1,r)w_m^r(:,r) \\ \Phi_k^r(2,1)w_m^r(:,1) & \Phi_k^r(2,2)w_m^r(:,2) & \ldots & \Phi_k^r(2,r)w_m^r(:,r) \end{bmatrix},$$

wherein $\Phi_k^r$ is a 2×r-dimension matrix, k=0, 1, ..., $K_r$−1, $w_m^r$ is a $N_T$/2×r-dimension matrix, m=0, 1, ..., $M_r$−1, r is the number of Ranks, $N_T$ is the number of transmitting antennas, X(:,l) represents the $l^{th}$ column of a matrix X, X($l_1$,$l_2$) represents an element in the $l_1^{th}$ row and in the $l_2^{th}$ column of the matrix X, and $\otimes$ represents a direct product of matrices, and a set consists of a number $K_r$ of $\Phi_k^r$ is a transformation codebook of the codebook in the two-stage structure, and a set consists of a number $M_r$ of $w_m^r$ is a basic codebook of the codebook in the two-stage structure.

10. The transmitting device according to claim 9, wherein a column vector of the matrix $w_m^r$ is a truncated $2^K$-DFT vector, and wherein $2^K \geq N_T/2$ and K is a natural number; and if $c_n^r$ is a codeword with a unitary characteristic, column vectors of the codeword $w_m^r$ of the basic codebook, corresponding to mutually non-orthogonal columns of the codeword $\Phi_k^r$ in the transformation codebook, are mutually orthogonal.

11. The transmitting device according to claim 10, wherein with $N_T$=8, the matrix $\Phi_k^r$ takes its values selected from all or a part of matrices in Table 1 below or first r columns in all or a part of matrices in Table 2 below, and the matrix $w_m^r$ takes its values selected from all or a part of matrices in Table 3 below or first r columns in all or a part of matrices in Table 4 below:

Table 1 is:

| Index k | Rank3 transformation codebook $\Phi_3^k$ | Rank4 transformation codebook $\Phi_4^k$ |
|---|---|---|
| 0 | $\begin{bmatrix} 1 & 1 & 1 \\ 1 & 1 & -1 \end{bmatrix}$ | $\begin{bmatrix} 1 & 1 & 1 & 1 \\ 1 & -1 & 1 & -1 \end{bmatrix}$ |
| 1 | $\begin{bmatrix} 1 & \sqrt{2} & 0 \\ 1 & 0 & \sqrt{2} \end{bmatrix}$ | $\begin{bmatrix} 1 & 0 & 1 & 0 \\ 0 & 1 & 0 & 1 \end{bmatrix}$, |

Table 2 is:

| Index | $\Phi_k$ |
|---|---|
| 0 | $\Phi_0 = \begin{bmatrix} 1 & 1 & 1 & 1 \\ 1 & -1 & 1 & -1 \end{bmatrix}$ |
| 1 | $\Phi_1 = \begin{bmatrix} 1 & 1 & 1 & 1 \\ -1 & 1 & -1 & 1 \end{bmatrix}$ |
| 2 | $\Phi_2 = \begin{bmatrix} 1 & 1 & 1 & 1 \\ j & -j & j & -j \end{bmatrix}$ |
| 3 | $\Phi_3 = \begin{bmatrix} 1 & 1 & 1 & 1 \\ -j & j & -j & j \end{bmatrix}$ |
| 4 | $\Phi_4 = \begin{bmatrix} 1 & 1 & 1 & 1 \\ \frac{1+j}{\sqrt{2}} & -\frac{1+j}{\sqrt{2}} & \frac{1+j}{\sqrt{2}} & -\frac{1+j}{\sqrt{2}} \end{bmatrix}$ |
| 5 | $\Phi_5 = \begin{bmatrix} 1 & 1 & 1 & 1 \\ -\frac{1+j}{\sqrt{2}} & \frac{1+j}{\sqrt{2}} & -\frac{1+j}{\sqrt{2}} & \frac{1+j}{\sqrt{2}} \end{bmatrix}$ |
| 6 | $\Phi_6 = \begin{bmatrix} 1 & 1 & 1 & 1 \\ \frac{-1+j}{\sqrt{2}} & \frac{1-j}{\sqrt{2}} & \frac{-1+j}{\sqrt{2}} & \frac{1-j}{\sqrt{2}} \end{bmatrix}$ |
| 7 | $\Phi_7 = \begin{bmatrix} 1 & 1 & 1 & 1 \\ \frac{1-j}{\sqrt{2}} & \frac{-1+j}{\sqrt{2}} & \frac{1-j}{\sqrt{2}} & \frac{-1+j}{\sqrt{2}} \end{bmatrix}$, |

Table 3 is:

| Index | Rank3 basic codebook $w_m^3$ | Rank4 basic codebook $w_m^4$ |
|---|---|---|
| 0 | $[v_0\ v_6\ v_6]$ | $[v_0\ v_0\ v_6\ v_6]$ |
| 1 | $[v_1\ v_7\ v_7]$ | $[v_1\ v_1\ v_7\ v_7]$ |
| 2 | $[v_2\ v_0\ v_0]$ | $[v_2\ v_2\ v_0\ v_0]$ |
| 3 | $[v_3\ v_1\ v_1]$ | $[v_3\ v_3\ v_1\ v_1]$ |
| 4 | $[v_4\ v_2\ v_2]$ | $[v_4\ v_4\ v_2\ v_2]$ |
| 5 | $[v_5\ v_3\ v_3]$ | $[v_5\ v_5\ v_3\ v_3]$ |
| 6 | $[v_6\ v_4\ v_4]$ | $[v_6\ v_6\ v_4\ v_4]$ |
| 7 | $[v_7\ v_5\ v_5]$ | $[v_7\ v_7\ v_5\ v_5]$, | and Table 4 is:

| Index | $w_m$ |
|---|---|
| 0 | $w_0 = [v_0\ v_1\ v_2\ v_3]$ |
| 1 | $w_1 = [v_1\ v_2\ v_3\ v_4]$ |
| 2 | $w_2 = [v_2\ v_3\ v_4\ v_5]$ |
| 3 | $w_3 = [v_3\ v_4\ v_5\ v_6]$ |
| 4 | $w_4 = [v_4\ v_5\ v_6\ v_7]$ |
| 5 | $w_5 = [v_5\ v_6\ v_7\ v_0]$ |
| 6 | $w_6 = [v_6\ v_7\ v_0\ v_1]$ |
| 7 | $w_7 = [v_7\ v_0\ v_1\ v_2]$, | wherein:

| Index | $v_n$ |
|---|---|
| 0 | $v_0 = [1\ 1\ 1\ 1]^T$ |
| 1 | $v_1 = [1\ (1-j)/\sqrt{2}\ -j\ (-1-j)/\sqrt{2}]^T$ |
| 2 | $v_2 = [1\ -j\ -1\ j]^T$ |
| 3 | $v_3 = [1\ (-1-j)/\sqrt{2}\ j\ (1-j)/\sqrt{2}]^T$ |
| 4 | $v_4 = [1\ -1\ 1\ -1]^T$ |
| 5 | $v_5 = [1\ (-1+j)/\sqrt{2}\ -j\ (1+j)/\sqrt{2}]^T$ |
| 6 | $v_6 = [1\ j\ -1\ -j]^T$ |
| 7 | $v_7 = [1\ (1+j)/\sqrt{2}\ j\ (-1+j)/\sqrt{2}]^T$. |

12. The transmitting device according to claim 9, wherein the codebook in the two-stage structure comprises a codebook resulting from column exchange.

13. A receiving device, comprising a receiving module, a channel estimating module, a codeword selecting module, a codeword index information generating module and a transmitting module, wherein:
the receiving module is configured to receive information transmitted from a transmitting device;
the channel estimating module is configured to estimate channel state information according to the information;
the codeword selecting module is configured to select a corresponding codeword from a codebook in a two-stage structure according to the channel state information;
the codeword index information generating module is configured to generate codeword index information of the selected codeword; and
the transmitting module is configured to transmit the codeword index information of the codeword to the transmitting device;
wherein a codeword $c_n^r$ in the codebook in the two-stage structure satisfies the following relationship:

$$c_n^r = [\Phi_k^r(:,1) \otimes w_m^r(:,1)\ \Phi_k^r(:,2) \otimes w_m^r(:,2)\ \ldots\ \Phi_k^r(:,r) \otimes w_m^r(:,r)]$$

$$= \begin{bmatrix} \Phi_k^r(1,1)w_m^r(:,1) & \Phi_k^r(1,2)w_m^r(:,2) & \ldots & \Phi_k^r(1,r)w_m^r(:,r) \\ \Phi_k^r(2,1)w_m^r(:,1) & \Phi_k^r(2,2)w_m^r(:,2) & \ldots & \Phi_k^r(2,r)w_m^r(:,r), \end{bmatrix}$$

wherein $\Phi_k^r$ is a 2×r-dimension matrix, k=0, 1, ..., $K_r$−1, $w_m^r$ is a $N_T/2$×r-dimension matrix, m=0, 1, ..., $M_r$−1, r is the number of Ranks, $N_T$ is the number of transmitting antennas, X(:,l) represents the $l^{th}$ column of a matrix X, $X(l_1,l_2)$ represents an element in the $l_1^{th}$ row and in the $l_2^{th}$ column of the matrix X, and ⊗ represents a direct product of matrices, and a set consists of a number $K_r$ of $\Phi_k^r$ is a transformation codebook of the codebook in the two-stage structure, and a set consists of a number $M_r$ of $w_m^r$ is a basic codebook of the codebook in the two-stage structure.

14. The receiving device according to claim 13, wherein a column vector of the matrix $w_m^r$ is a truncated $2^K$-DFT vector, and wherein $2^K \geq N_T/2$ and K is a natural number; and if $c_n^r$ is a codeword with a unitary characteristic, column vectors of the codeword $w_m^r$ of the basic codebook, corresponding to mutually non-orthogonal columns of the codeword $\Phi_k^r$ in the transformation codebook, are mutually orthogonal.

15. The receiving device according to claim 14, wherein with $N_T=8$ the matrix $\Phi_k^r$ takes its values selected from all or a part of matrices in Table 1 below or first r columns in all or a part of matrices in Table 2 below, and the matrix $w_m^r$ takes its values selected from all or a part of matrices in Table 3 below or first r columns in all or a part of matrices in Table 4 below:

Table 1 is:

| Index k | Rank3 transformation codebook $\Phi$ | Rank4 transformation codebook $\Phi$ |
|---|---|---|
| 0 | $\begin{bmatrix} 1 & 1 & 1 \\ 1 & 1 & -1 \end{bmatrix}$ | $\begin{bmatrix} 1 & 1 & 1 & 1 \\ 1 & -1 & 1 & -1 \end{bmatrix}$ |
| 1 | $\begin{bmatrix} 1 & \sqrt{2} & 0 \\ 1 & 0 & \sqrt{2} \end{bmatrix}$ | $\begin{bmatrix} 1 & 0 & 1 & 0 \\ 0 & 1 & 0 & 1 \end{bmatrix}$, |

Table 2 is:

| Index | $\Phi_k$ |
|---|---|
| 0 | $\Phi_0 = \begin{bmatrix} 1 & 1 & 1 & 1 \\ 1 & -1 & 1 & -1 \end{bmatrix}$ |
| 1 | $\Phi_1 = \begin{bmatrix} 1 & 1 & 1 & 1 \\ -1 & 1 & -1 & 1 \end{bmatrix}$ |
| 2 | $\Phi_2 = \begin{bmatrix} 1 & 1 & 1 & 1 \\ j & -j & j & -j \end{bmatrix}$ |
| 3 | $\Phi_3 = \begin{bmatrix} 1 & 1 & 1 & 1 \\ -j & j & -j & j \end{bmatrix}$ |
| 4 | $\Phi_4 = \begin{bmatrix} 1 & 1 & 1 & 1 \\ \frac{1+j}{\sqrt{2}} & -\frac{1+j}{\sqrt{2}} & \frac{1+j}{\sqrt{2}} & -\frac{1+j}{\sqrt{2}} \end{bmatrix}$ |
| 5 | $\Phi_5 = \begin{bmatrix} 1 & 1 & 1 & 1 \\ -\frac{1+j}{\sqrt{2}} & \frac{1+j}{\sqrt{2}} & -\frac{1+j}{\sqrt{2}} & \frac{1+j}{\sqrt{2}} \end{bmatrix}$ |
| 6 | $\Phi_6 = \begin{bmatrix} 1 & 1 & 1 & 1 \\ \frac{-1+j}{\sqrt{2}} & \frac{1-j}{\sqrt{2}} & \frac{-1+j}{\sqrt{2}} & \frac{1-j}{\sqrt{2}} \end{bmatrix}$ |
| 7 | $\Phi_7 = \begin{bmatrix} 1 & 1 & 1 & 1 \\ \frac{1-j}{\sqrt{2}} & \frac{-1+j}{\sqrt{2}} & \frac{1-j}{\sqrt{2}} & \frac{-1+j}{\sqrt{2}} \end{bmatrix}$, |

Table 3 is:

| Index | Rank3 basic codebook $w_m^3$ | Rank4 basic codebook $w_m^4$ |
|---|---|---|
| 0 | $[v_0 v_6 v_6]$ | $[v_0 v_0 v_6 v_6]$ |
| 1 | $[v_1 v_7 v_7]$ | $[v_1 v_1 v_7 v_7]$ |
| 2 | $[v_2 v_0 v_0]$ | $[v_2 v_2 v_0 v_0]$ |
| 3 | $[v_3 v_1 v_1]$ | $[v_3 v_3 v_1 v_1]$ |
| 4 | $[v_4 v_2 v_2]$ | $[v_4 v_4 v_2 v_2]$ |
| 5 | $[v_5 v_3 v_3]$ | $[v_5 v_5 v_3 v_3]$ |
| 6 | $[v_6 v_4 v_4]$ | $[v_6 v_6 v_4 v_4]$ |
| 7 | $[v_7 v_5 v_5]$ | $[v_7 v_7 v_5 v_5]$, | and Table 4 is:

| Index | $w_m$ |
|---|---|
| 0 | $w_0 = [v_0 v_1 v_2 v_3]$ |
| 1 | $w_1 = [v_1 v_2 v_3 v_4]$ |
| 2 | $w_2 = [v_2 v_3 v_4 v_5]$ |
| 3 | $w_3 = [v_3 v_4 v_5 v_6]$ |
| 4 | $w_4 = [v_4 v_5 v_6 v_7]$ |
| 5 | $w_5 = [v_5 v_6 v_7 v_0]$ |
| 6 | $w_6 = [v_6 v_7 v_0 v_1]$ |
| 7 | $w_7 = [v_7 v_0 v_1 v_2]$, | wherein:

| Index | $v_n$ |
|---|---|
| 0 | $v_0 = [1\ 1\ 1\ 1]^T$ |
| 1 | $v_1 = [1\ (1-j)/\sqrt{2}\ -j\ (-1-j)/\sqrt{2}]^T$ |
| 2 | $v_2 = [1\ -j\ -1\ j]^T$ |
| 3 | $v_3 = [1\ (-1-j)/\sqrt{2}\ j\ (1-j)/\sqrt{2}]^T$ |
| 4 | $v_4 = [1\ -1\ 1\ -1]^T$ |
| 5 | $v_5 = [1\ (-1+j)/\sqrt{2}\ -j\ (1+j)/\sqrt{2}]^T$ |
| 6 | $v_6 = [1\ j\ -1\ -j]^T$ |
| 7 | $v_7 = [1\ (1+j)/\sqrt{2}\ j\ (-1+j)/\sqrt{2}]^T$. |

16. The receiving device according to claim 13, wherein the codebook in the two-stage structure comprises a codebook resulting from column exchange.

* * * * *